United States Patent [19]
Caddy

[11] Patent Number: 4,578,766
[45] Date of Patent: Mar. 25, 1986

[54] COMPUTER-AIDED PROCESS FOR GENERATING CAMERA-READY GRAPHICAL ARTWORK

[75] Inventor: Michael J. Caddy, Doylestown, Pa.

[73] Assignee: The United States of America as represented by the Secretary of the Navy, Washington, D.C.

[21] Appl. No.: 528,710

[22] Filed: Sep. 1, 1983

[51] Int. Cl.⁴ .................. G06F 15/06; H04N 7/00
[52] U.S. Cl. .................... 364/521; 364/300
[58] Field of Search ........... 364/521, 519, 520, 300, 364/189, 518, 512; 340/728, 723

[56] References Cited

U.S. PATENT DOCUMENTS

| | | | |
|---|---|---|---|
| 3,579,194 | 5/1971 | Weinblatt | 364/300 |
| 4,148,066 | 4/1979 | Saylor | 364/521 X |
| 4,475,161 | 10/1984 | Stock | 364/521 |
| 4,511,928 | 4/1985 | Colomb | 364/519 X |
| 4,514,818 | 4/1985 | Walker | 364/521 |

OTHER PUBLICATIONS

A High Speed Graphics Display Controller, Electronic Product Design, Feb. 1982, pp. 43-47.

*Primary Examiner*—Edward J. Wise
*Attorney, Agent, or Firm*—Robert F. Beers; Henry Hansen; Armand M. Vozzo, Jr.

[57] ABSTRACT

A computer-aided process is disclosed for automatically generating a camera-ready hardcopy of a graphical plot upon command instructions inputted via a conventional storage tube graphics display terminal having an addressable cross-hair cursor and a keyboard. In accordance with an interactive graphics code or program, tabular data coordinates stored in computer file form are retrieved and plotted on appropriately titled and scaled axes with the plotted coordinates being interconnected along curves formed of a smooth or linear nature by interpolation. The graphical plot viewed on the display terminal is further enhanced by inclusion of labels, shaded areas, and reference symbols and characters prior to printing out the hardcopy of an associated hardcopy unit coupled to the display terminal.

5 Claims, 18 Drawing Figures

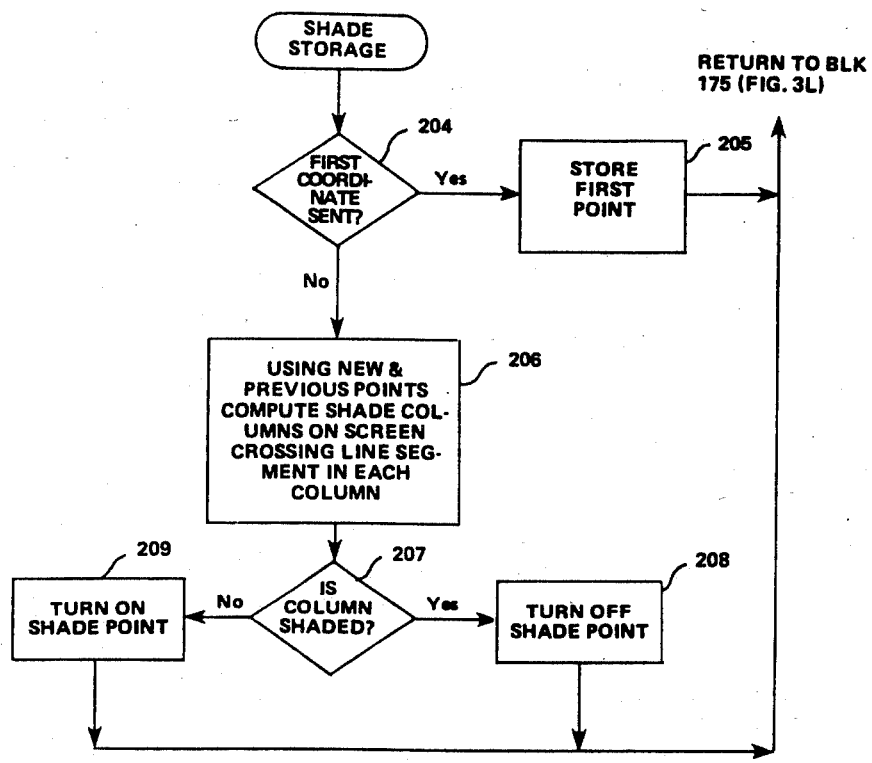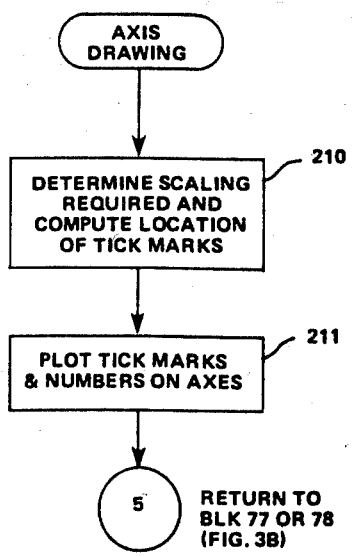
FIG. 30

COMPUTER-AIDED PROCESS FOR GENERATING CAMERA-READY GRAPHICAL ARTWORK

STATEMENT OF GOVERNMENT INTEREST

The invention described herein may be manufactured and used by or for the Government of the United States of America for governmental purposes without the payment of any royalties thereon or therefor.

APPENDIX

An appendix consisting of 51 pages is included in this application.

BACKGROUND OF THE INVENTION

The present invention relates to graphic arts in general and more particularly to an improved process for automatically generating camera-ready graphical artwork with the aid of a computer.

Graphical artwork, more specifically, graphical plots are commonly used as a visual aid to display a substantial amount of information regarding the coordinate relationships of certain variable physical quantities. In addition to the plotting of the basic coordinate data, typically for selected values of a variable factor or condition, such graphical plots generally include a variety of reference lines or curves as well as shading patterns for ready observation and interpretation of the data. Large quantities of these highly informative graphical plots, often found in scientific works and technical reports and manuals, are usually printed using conventional methods of photolithography that require production of a high-quality reproduction copy of the graphical plots in intricate detail, ready for photographing by a process camera.

Commonly known as being camera-ready, such high-quality reproduction copies of the graphical plots have been difficult and time-consuming to produce as well as to edit and correct if necessary. Hand-drawing and editing of the plots by skilled draftsmen, although satisfactory from a quality standpoint, continues to be painstaking and costly. Machine-drawn plots can be produced in substantially less time and have generally been adequate in quality and detail. However, such machine-drawn artwork still requires manual "cut-outs" and "paste-ons" to meet camera-ready requirements.

SUMMARY OF THE INVENTION

Accordingly, it is a main purpose and general object of the present invention to provide an improved process implemented by a computer for generating graphical artwork of a finished quality ready for photoligographic reproduction.

It is a more particular object of the present invention to provide a computer-aided process for producing original camera-ready graphical plots in full detail without requiring any manual drafting labor.

It is a further object of the present invention to provide an automated process for creating revised camera-ready graphical plots that permits custom editing and correcting of existing plots quickly and precisely without manually redrawing revisions and affixing those revisions to the existing plots.

It is a still further object of the present invention to provide a computer-aided process for graphical artwork generation that is cost effective, reliable in performance, and easily adapted to existing automated graphic art equipment.

Briefly, these and other aspects of the present invention are accomplished by a computer-aided process for automatically generating a camera-ready hardcopy of a graphical plot upon command instructions inputted via a conventional storage tube graphics display terminal having an addressable cross hair cursor and a keyboard. In accordance with an interactive graphics code or program, tabular data coordinates stored in computer file form are retrieved and plotted on appropriately titled and scaled axes with the plotted coordinates being interconnected along curves formed of a smooth or linear nature by interpolation. The graphical plot viewed on the display terminal is further enhanced by inclusion of labels, shaded areas, and reference symbols and characters prior to printing out the hardcopy on an associated hardcopy unit coupled to the display terminal.

For a better understanding of these and other aspects of the present invention, reference may be made to the following detailed description taken in conjunction with the accompanying drawings in which like reference numerals designate like parts throughout the figures thereof.

DESCRIPTION OF THE PREFERRED EMBODIMENT

Figure 1:
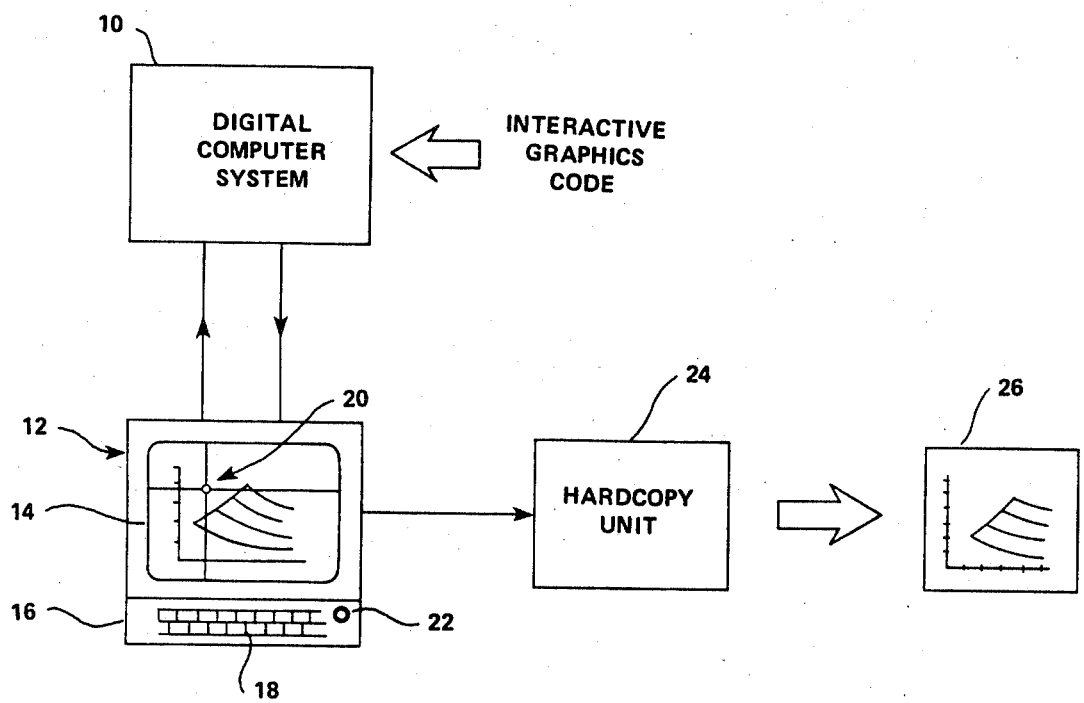
FIG. 1 is a general block diagram showing the hardware used to implement the process for automatically generating camera-ready graphical plots in accordance with the present invention.

Referring now to FIG. 1, the process for automated graphics generation according to the present invention is primarily aided and implemented by a general purpose digital computer system 10 serving as the host and programmed to operate in accordance with an interactive graphics code, described in greater detail hereinafter.

It should be noted that the interactive graphics code, used by the host computer system 10 to interpret and perform the interactive requests of the user is also described in the Appendix, which is the source code listing of the interactive graphics code written in FORTRAN IV. This source code listing of the instructions, routines, and other contents of the interactive graphics code in appropriate sequence may be implemented, for example, on a CDC Cyber Model 175 computer using a FORTRAN computer CDC Version 438, a linker/loader CDC Version 1.5538 for Network Operating System (NOS) 1.4, and a library module TEKTRONIX Plot 10.

Stored with sets of tabular data coordinates in computer file form, digital computer system 10 is coupled to a conventional storage tube graphics display terminal 12 which accepts data from and sends data to the computer system. Display terminal 12 is equipped with a screen 14 on which output from computer system 10 is displayed to a user, the screen being the face of a storage tube device (not shown), typically a cathode ray tube (CRT), which maintains a display once written, for an indefinite period of time until an erasure is made. Display terminal 12 is further provided with a control panel 16 on which a keyboard 18 is located for allowing the user to enter alphanumeric (A/N) data onto the screen 14 and onto the computer system 10. A cursor control 22 also located on the control panel 16 is employed by the user to address a graphic cross-hair cursor 20 movable across screen 14 to specify positional input of data. The display terminal 12 with the aforedescribed features is a commercially available unit, one suitable such unit being the Tektronix Model 4015 with its associated graphics software. A conventional hardcopy unit 24 compatible with display terminal 12 is coupled thereto for producing, in accordance with the present invention, a camera-ready, hardcopy 26 of a graphical plot produced on the screen 14.

Figure 2:
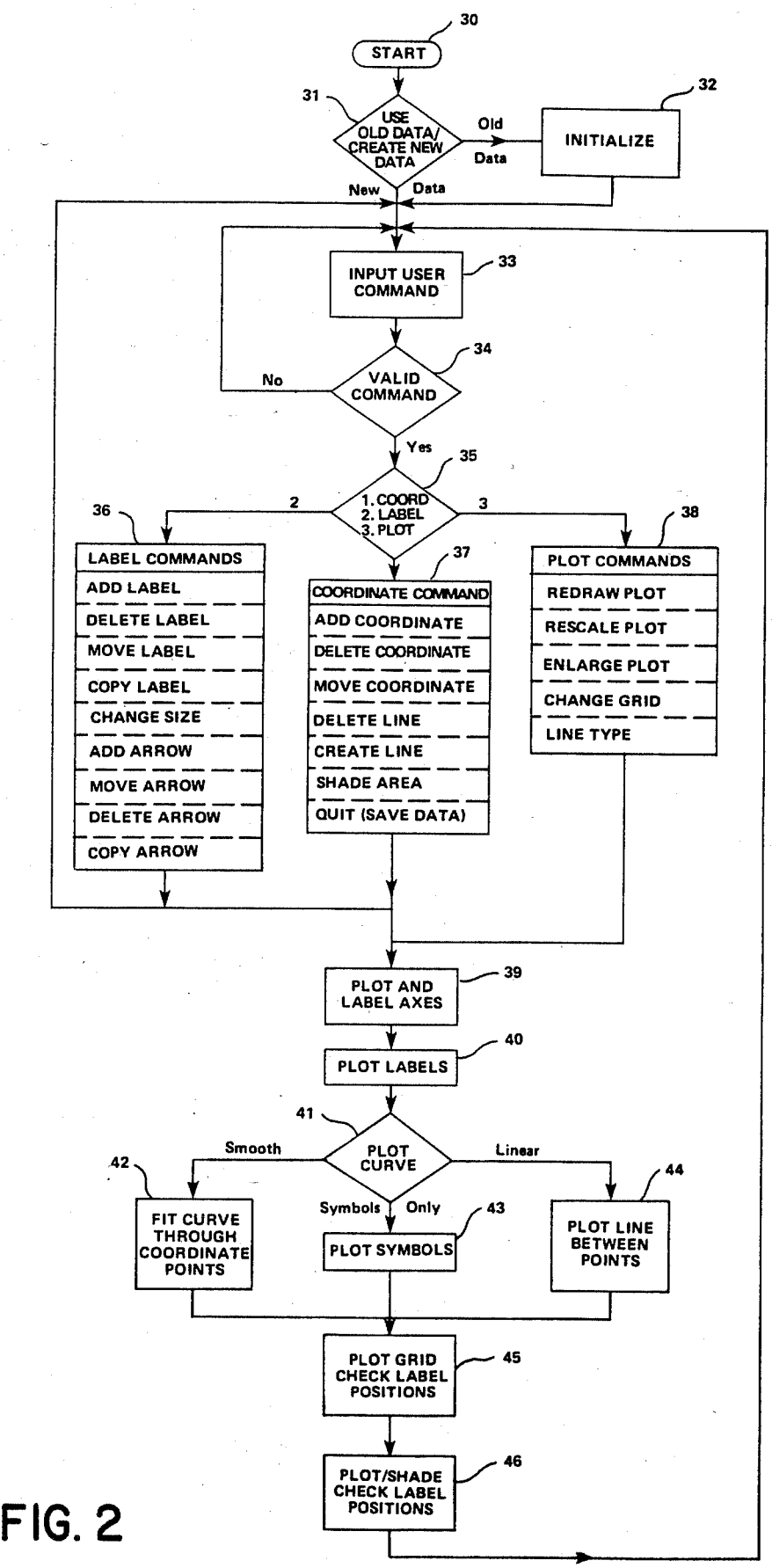
FIG. 2 is a general flow diagram of the computer-aided process of the present invention, showing the broad stages of data processing steps and their standard sequence.

Referring now to FIG. 2, Block 31 represents a general start up procedure in which the user establishes communication with the host computer system 10 and commands use of old data files and eventually begins execution of the interactive graphics code. Block 31 is a query as to creating a new data file or using the old one. If the user's response is new data, then a query for axis labels and other minimum graphical data is indicated. In Block 31, the old data is automatically inputted into storage along with labels and other information. Block 33 is the top of the interactive loop in which the user physically moves the coordinates on screen 14 via cross-hair cursor 20 and keys a single character on keyboard 18. This single character and the coordinates comprise a user command. Block 33 additionally performs other data checks such as, if this is a new plot (no data to plot), a create line command is automatically executed. Block 34 checks for a valid command. An invalid command sends control back to block 33. Blocks 35 thru 38 interpret the command, use the coordinate data, if required, and act appropriately on the plot.

Three groups of commands are available: label, coordinate and plot. Block 36 only concerns labeling. Block 37 concerns only line forming, coordinate points and shading. Block 38 concerns the general plot attributes, such as size, grid and line types. Block 39 thru 46, inclusive, follow a command to plot the data. Block 39 uses the minimum and maximum data ranges and the grid requirements, and picks an appropriate scale on each axis, finally plotting the axis and labels. Block 40, besides plotting other labels, saves the four coordinate points around the label for later use. Blocks 41 thru 44, inclusive, are concerned with lines on the plot. Options are available for smooth curve, linear, or just symbols. In addition, lines can be one of 9 dash line types with options for solid thick or thin lines, as well as closed or open curves. Block 45 plots the grid as specified and uses the label coordinate point data generated in block 40 such that no grid line extends thru a label. Block 46 completes the plot by determining shading regions and plotting them with a uniform grid of dots again avoiding shading of labels. The end result of block 46 is that the user has on the screen 14 the latest edited plot. At this point control is transferred to block 33 for more editing or termination of the plot.

Figure 3A:
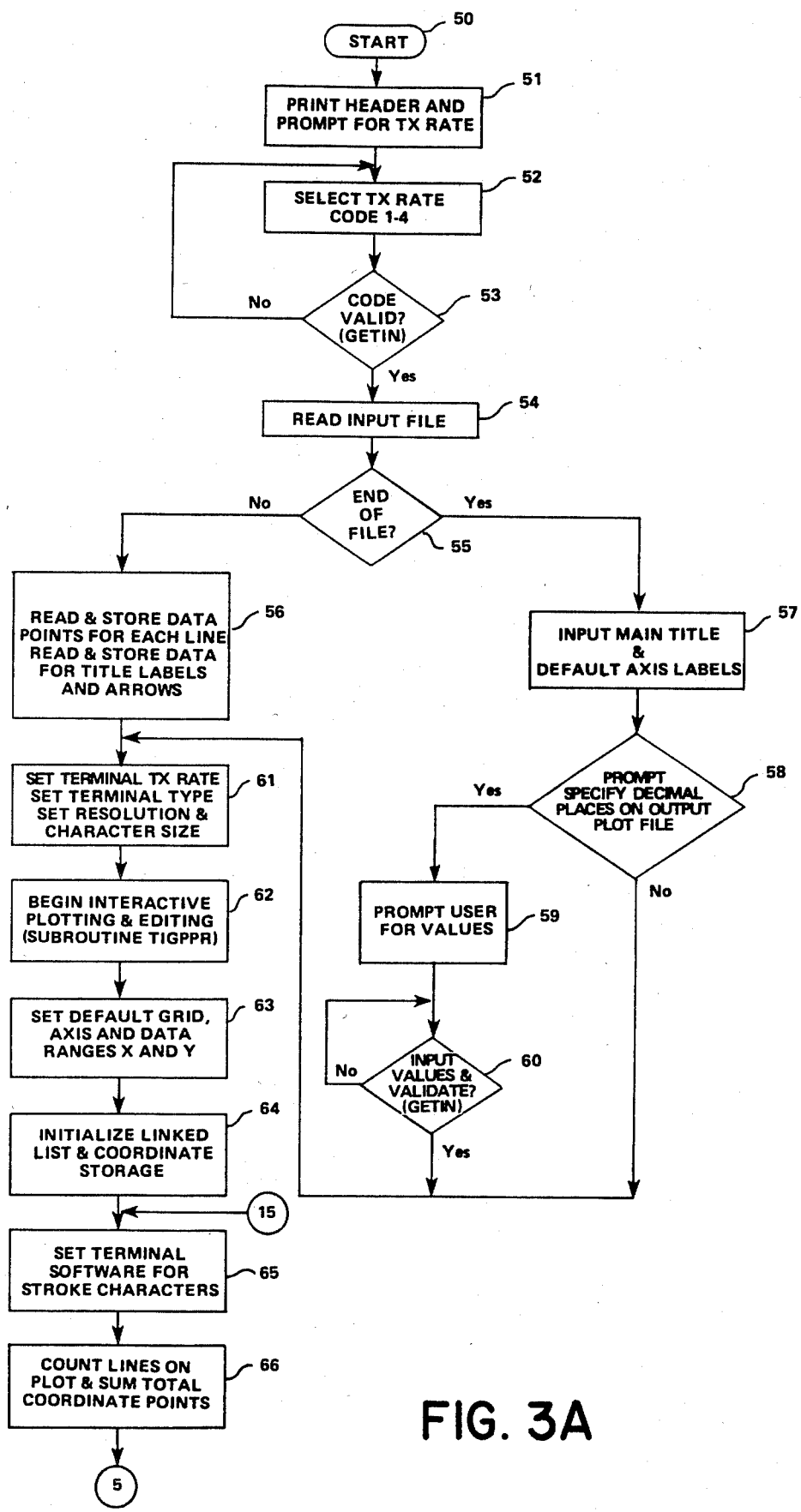
FIGS. 3A–3P, inclusive, represent a more detailed flow diagram of the computer-aided process in accordance with the present invention.

Referring now to FIG. 3A, in Block 50 the user turns on the display terminal 12, connects to the host computer system 10 and begins execution of the interactive graphics code. Block 51 prompts the user as to product and date of version of the graphics code. In addition, a query is issued for a communication transmission rate with the host computer system 10. In block 52, the user picks an appropriate code number 1-4, indicating the desired rate of character transmission or baud rate. For example, codes 1-4 typically designate baud rates of 1200, 2400, 4800 and 9600 characters per second, respectively. Block 53 checks the baud rate code and passes to block 54 if valid; otherwise, the process moves back to block 52. Block 54 makes a read attempt to determine if the user has connected through the host computer system 10 another file containing an old plot data set. Block 55 checks this read and if an end of file was found, then a new plot is implied and the user is prompted for minimum data (plot axis labels for storage) in block 57. Block 58 queries the user for decimal places for each data group. These data are those generated during the plot creation and used to generate a data file of the created plot for storage in the files of the host computer system 10. Blocks 59 and 60 check and query the user for these data. Referring back to the other branch of block 55, in block 56 old plot data is read from file storage and readied for use. Block 61 sets the communications transmission rate and the character size on the screen 14 of display terminal 12 to small. Block 62 begins the interactive plotting in subroutine TIGPPR. Block 63 sets the grid and range of data to either user input values or default. The default data range is the minimum and maximum values of the X and Y data, respectively. Block 64 initializes a set of points to the serial coordinate data forming a linked list. The linked list is used to efficiently add or delete a coordinate data point to a line or shaded area. Block 65 sets the graphics software associated with the display terminal 12 for use of stroke generated characters rather than a composite (one of four fixed size horizontal characters). This is required in order to generate labels at any size and rotation. Block 66 operates on the linked list, determines the number of lines and where each line begins in the linked list data storage.

Figure 3B:
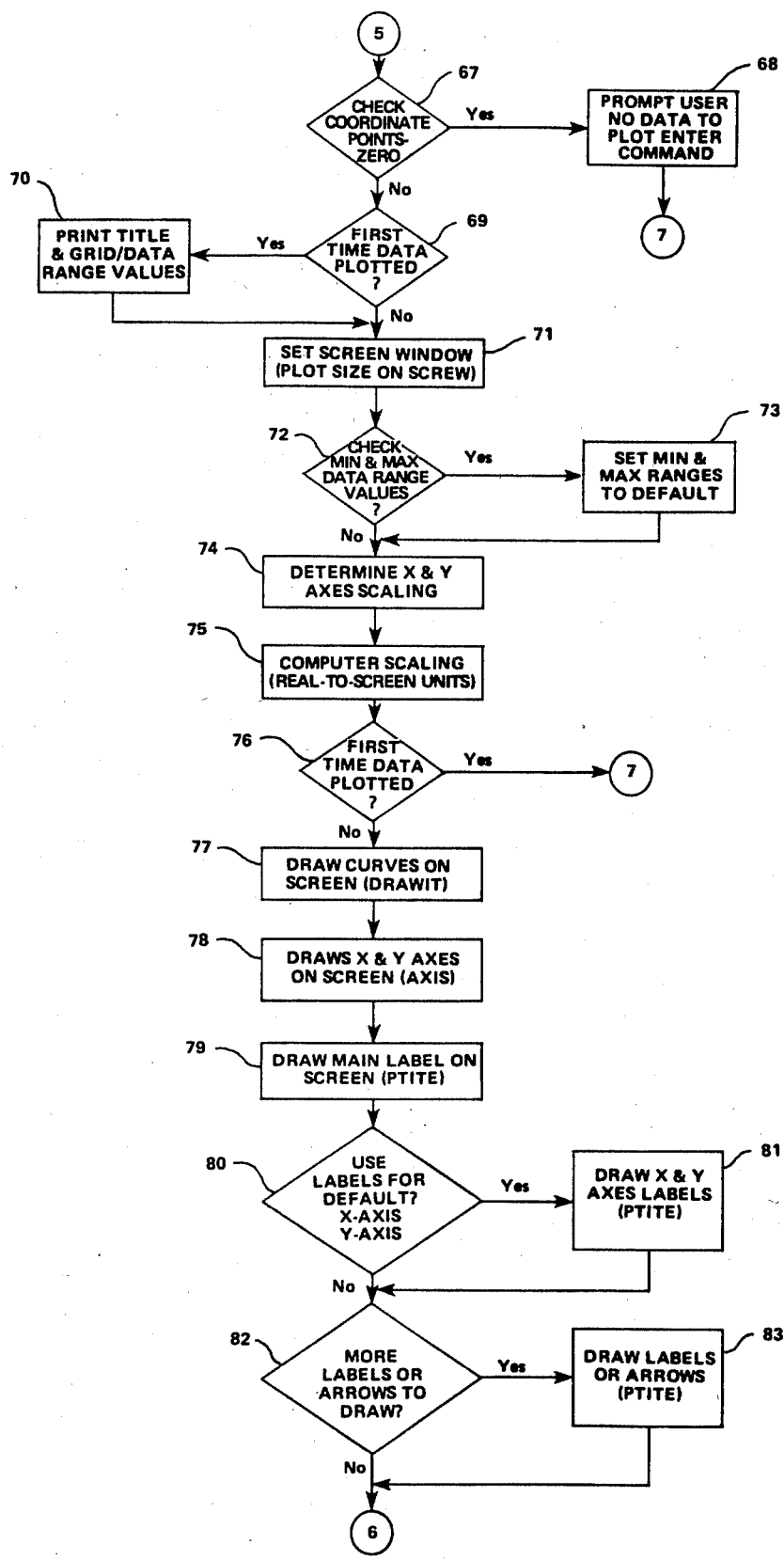

Referring now to FIG. 3B, block 67 checks the number or coordinate points and, if it is zero (a new plot), the user is prompted and sent to the command mode. If data exists, then a check is made in block 69 to see if this data has been plotted once. If not, block 70 prints the main plot label and GRID/DATA range values. A window on screen 14 (physical plot size) is now set in block 17. Block 72 checks the validity of data ranges. If they are not valid, block 73 computes minimum and maximum values, respectively. Block 74 determines data scaling parameters from minimum and maximum X and Y values. The scales being preset to multiples of 1, 2 or 5. Block 75 computes the scaling of real units to the screen units, typically 4096×4096, on the display terminal 12. Block 76 checks for first time plot and gives the user a chance to change size, grid and other parameters. Blocks 77, 78 and 79 are reference to respective subroutines for drawing curves and labels, shown in greater detail in FIGS. 3L, 3M and 3O, respectively. Blocks 80 thru 83 determine if default axis labels are drawn, and draw all other labels using the subroutine PTITE, shown in greater detail in FIG. 3M.

Figure 3C:
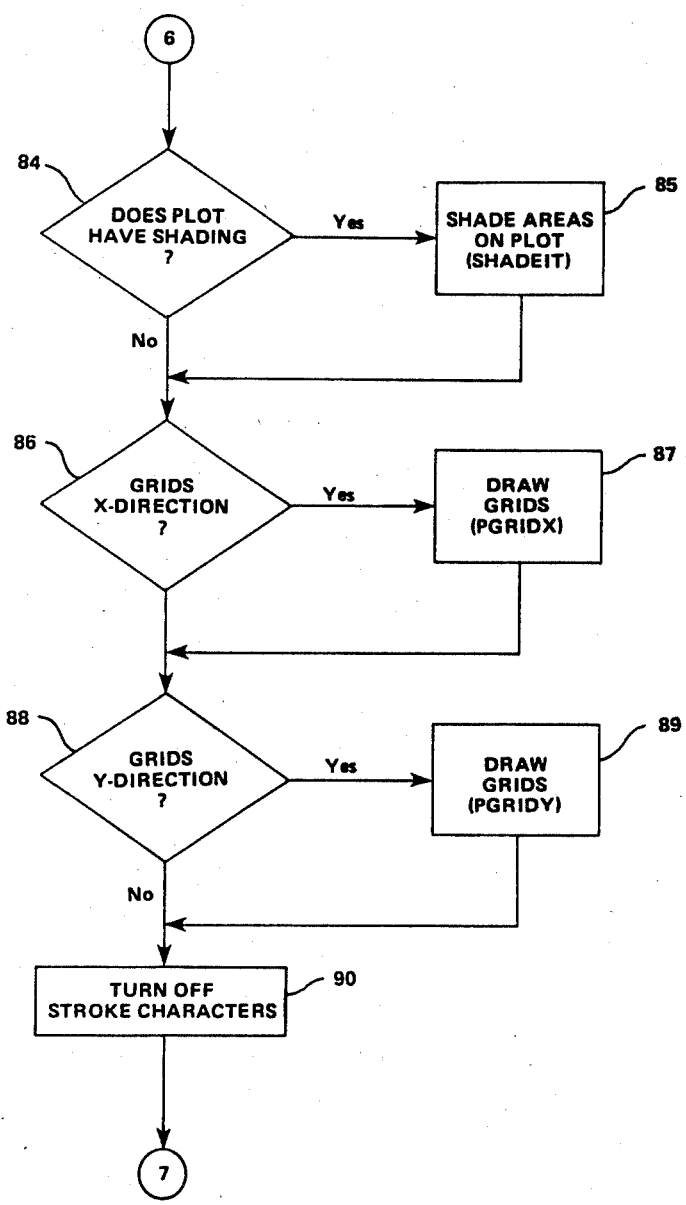

Referring now to FIG. 3C, block 84 checks for existence of shading. If shading exists, then subroutine SHADIT, shown in FIG. 3P, is called in block 85. Similarly, both X and Y Grid requirements are checked and subroutines PGRIDX and PGRIDY shown in FIG. 3N are called as needed. Block 90 turns off the stroke characters since they are not needed in the command mode.

Figure 3D:
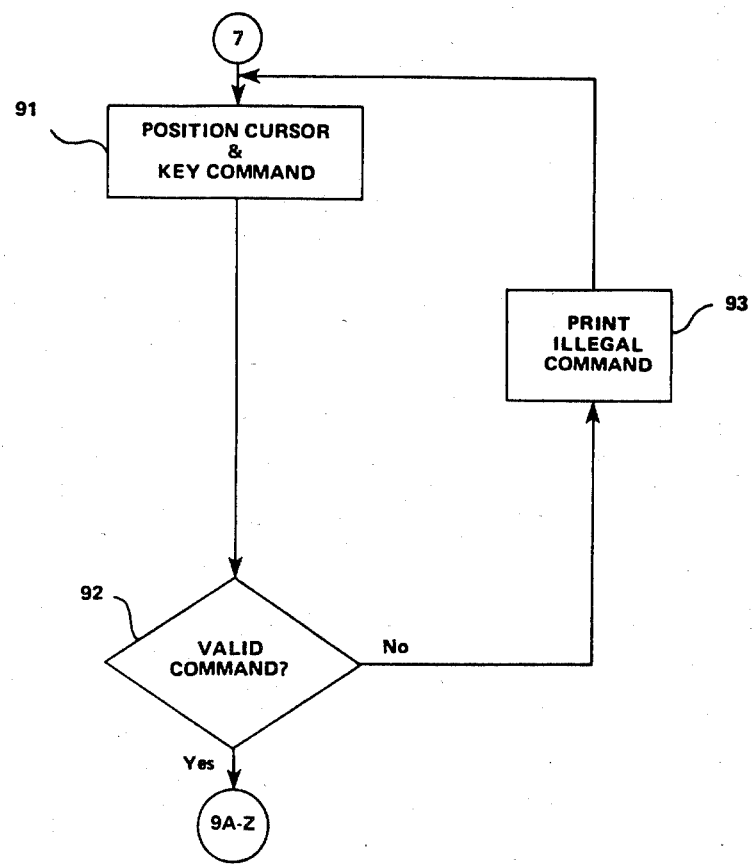

Referring now to FIG. 3D, in block 91, the user physically positions the movable cross-hair cursor 20 to a position on screen 14 after which a single character on keyboard 18 is depressed. The character depressed is used to determine the coordinate command and the position of the cross-hair cursor 20 on screen 14 used to compute a coordinate position X and Y. Block 92 checks for a valid command by performing a table lookup using the ASCII code for the character keyed. The ASCII is the American Standard Code for Information Interchange, a standard code consisting of 7-bit elements for information interchange among data processing communications systems. Block 92 flags the character as invalid, i.e. illegal, and re-prompts user in block 91. A valid coordinate command from the user continues the process as desired, and such valid commands are as follows:

| VALID COORDINATE COMMAND SUMMARY | |
|---|---|
| COMMAND | DESCRIPTION |
| A | add point after reference point |
| B | add point before reference point |
| C | identify closest data point (to cross hairs) |
| D | delete data point |
| E | exit |
| F | format (change line type) |
| G | input grid data |
| H | halt graphics tablet mode |
| K | kill line with closest data point to cross hairs |
| L | ENTER label mode and locate closest label to cross hairs |
| M | MOVE identified data point to new position |
| N | input a new data point beginning a new line |
| P | re-plot the current data using same window scale |
| Q | quit label mode |
| R | repeat the current data (but resize it to fill screen) |
| S | show real values X and Y at current screen position |
| T | Enter graphic tablet mode |
| V | input direct coordinate values for X and Y |
| W | Window data P replot to new minimum and maximum values |

The above coordinate commands, prefixed each respectively by the number "9", are shown in FIGS. 3E, 3F, 3G, 3H, 3J and 3K and are described in greater detail hereinafter with appropriate reference to those figures.

Figure 3E:
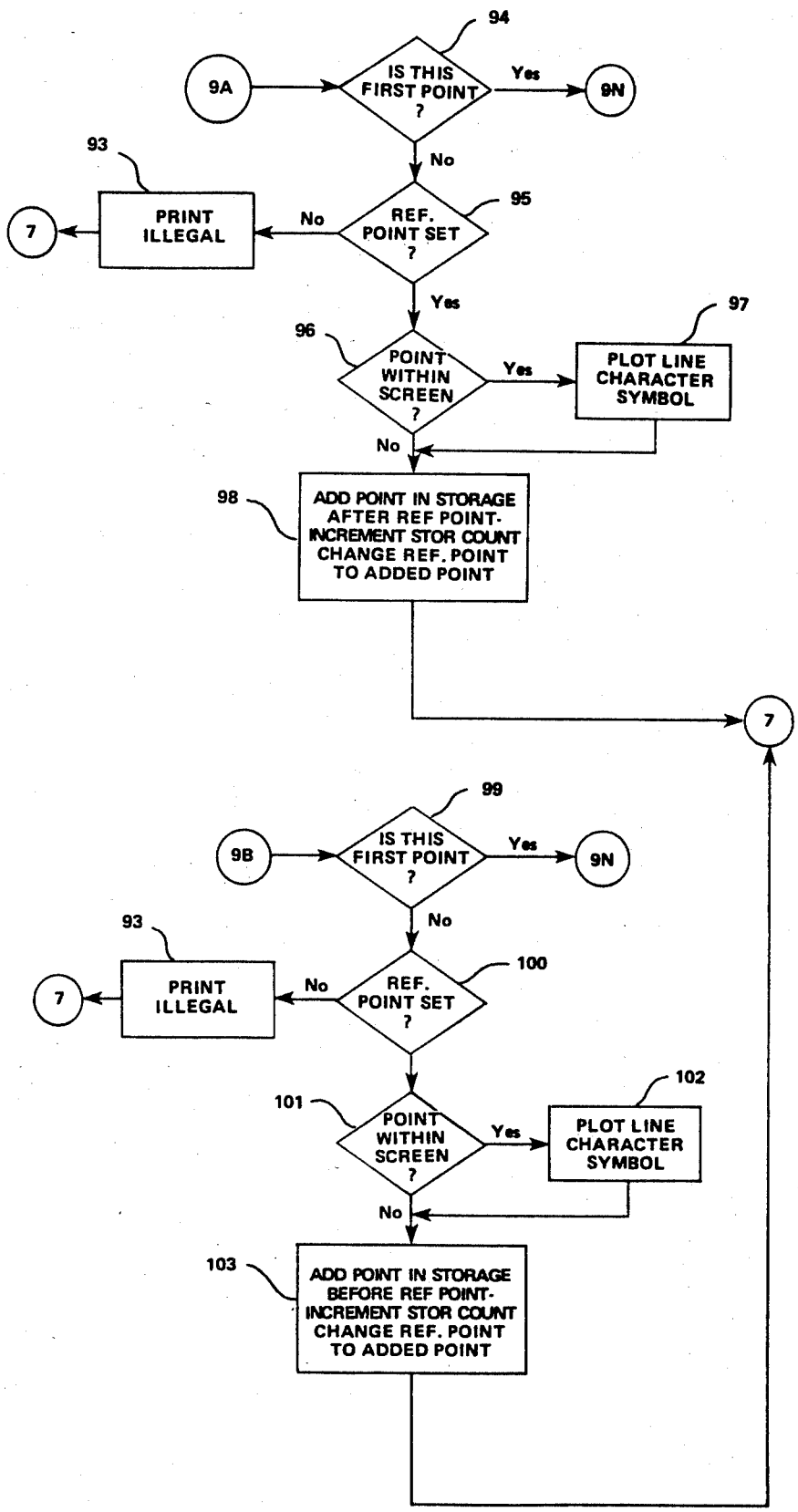

Referring now to FIG. 3E, block 94 checks to see if this is the first point of a new plot; if it is, then control is transferred to the appropriate coordinate command for inputting a new line. The command "A" (99A) basically adds a point in storage after a reference point, the reference point being set by the command "C" (9C), shown in FIG. 3F. Block 95 checks to see if the user had set a reference point, a transfer to block 93 indicating a point not set and an invalid command. Block 96 checks to see if the point is within the plot frame on the screen 14 of display terminal 12. Block 90 plots a character indicating the line type at a coordinate position selected by the user. Block 98, using the linked list storage, adds the new point into the list after the reference point, and changes the reference point to the new point just added. Coordinate command "B" (9B), also shown in FIG. 3E, follows the same logic as the "A" command except as to placement of the new point relative to the reference point. Via block 103, the "B" command puts the point before the reference point in storage. The linked list is used the same way except the coordinate values are swapped so that the link list remains the same as in the A command mode.

Figure 3F:
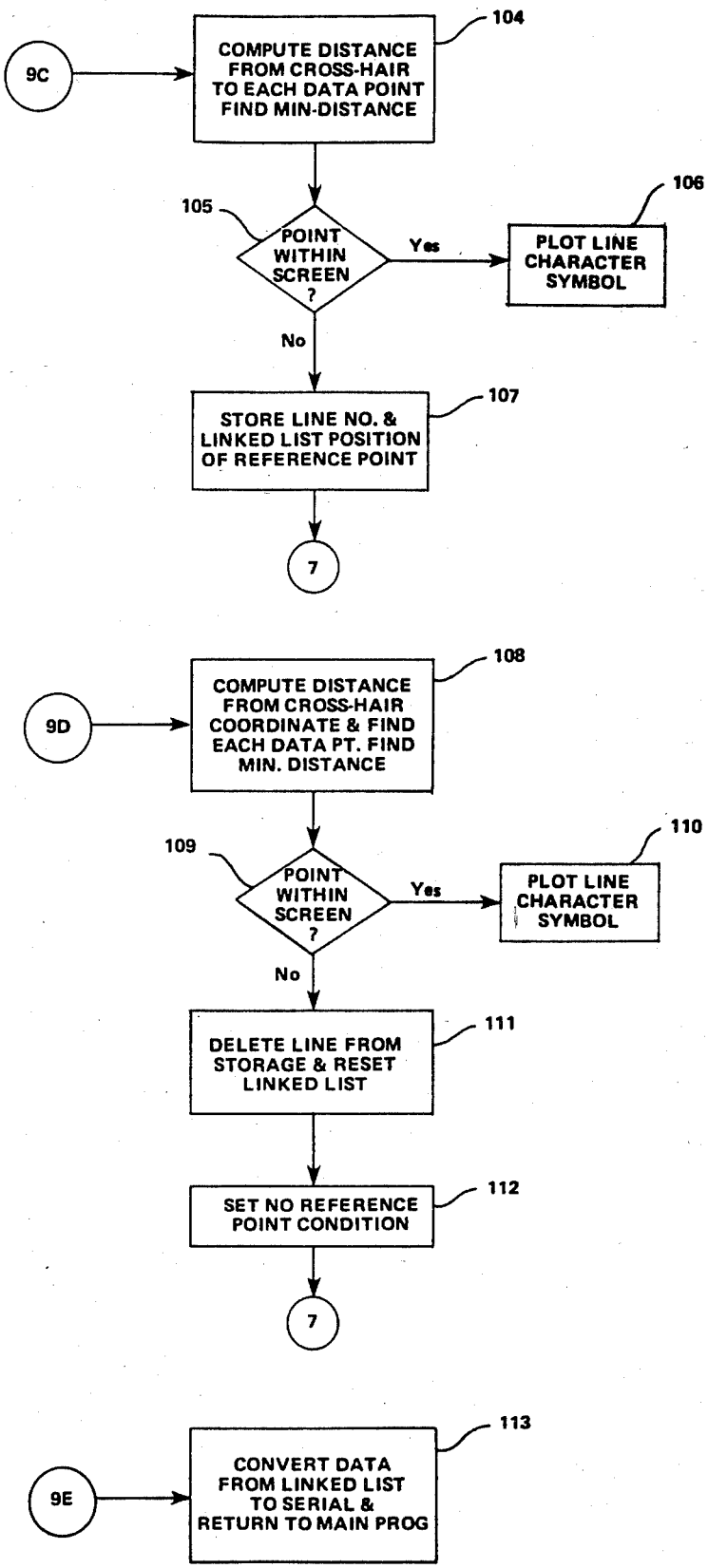

Referring now to FIG. 3F, the "C" command (9C) establishes a reference point by finding the closes coordinate point per block 104. Blocks 105 and 106 check the point and plot a line character symbol if the point is within the plot frame. Block 107 moves the linked list forward pointer to the next set of coordinate points and stores the positions and line number of the reference point. The "D" coordinate command (9D), also shown in FIG. 3F, deletes a coordinate point and performs the same operations in blocks 108, 190 and 110 as the respective blocks 104, 105 and 106 for "C" command. The "D" command differs, however, from the "C" command in that in Block 111 the point is deleted from the linked list. This is accomplished by moving the forward coordinate set, as pointed to by the forward pointer, to the deleted point position. The unused data storage space is then added to another linked list which is a list of unused storage. Block 112 turns off the reference pointer flag since the point was just deleted. The "E" or exit coordinate command (9E) is executed per block 113 which terminates the plot, returns to the main program, and converts the linked data to serial data and outputs the data with all corrections, labels and arrows to the file of host computer 10.

Figure 3G:
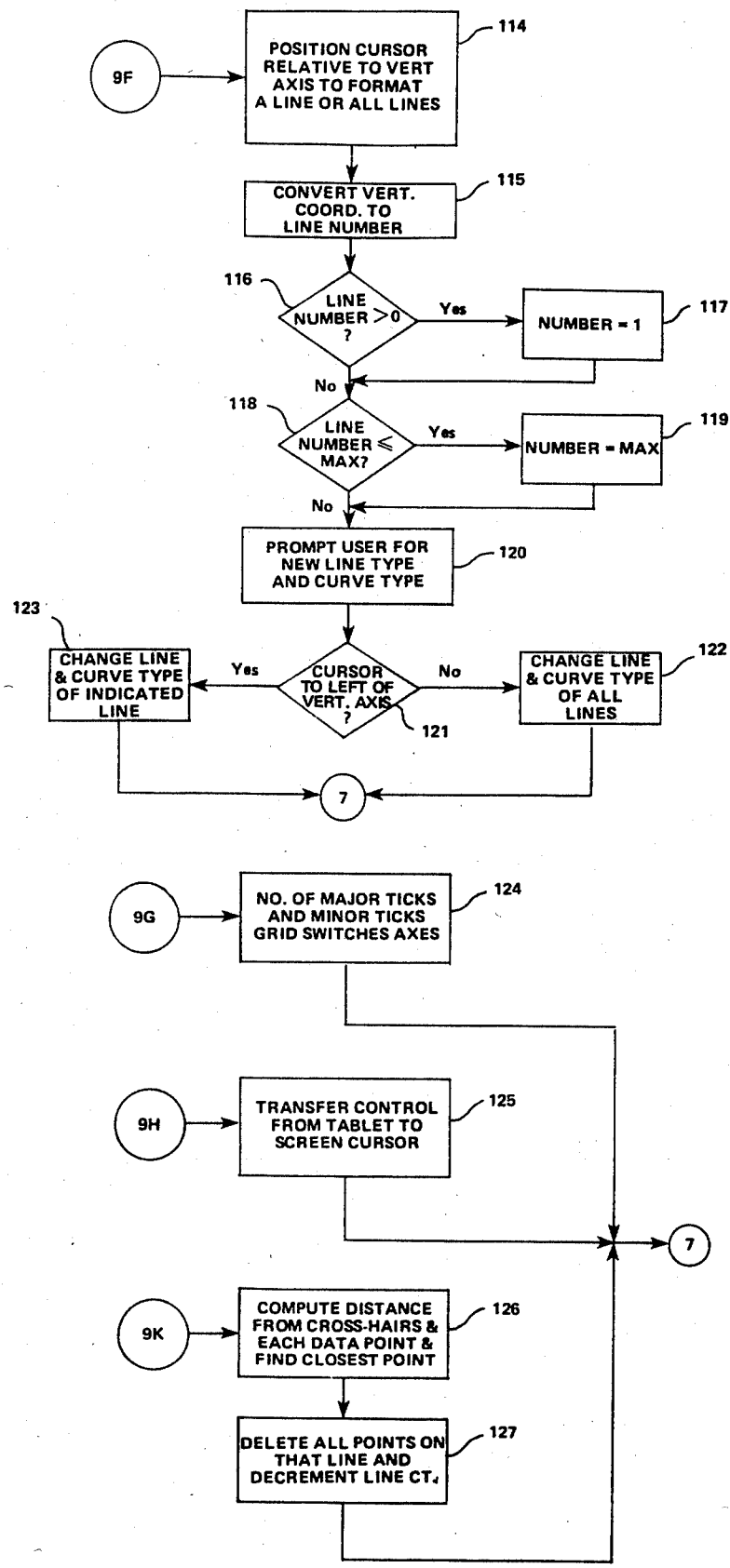

Referring now to FIG. 3G, the "F" or format command (9F) can change the line characteristics in terms of linear, smooth, symbols only, no symbols, closed curve, or shade. The user positions the cross-hair cursor 20 either to the left or right of the vertical axis of the plot. Block 121 checks for this relative position of cursor 20. If the position is to the left, block 122 is used and the line type and curve type are changed for all lines of the entire plot. If the cursor position is to the right of the vertical axis, block 123 is used and the format change only applies to the indicated line. The lines and associated symbols are listed in a column at the left top of the terminal display screen 14. In block 115, the vertical coordinate position is used to determine the closest line and symbol. The line number is derived from this operation. Blocks 116, 117, 118 and 119 check that value and keep it within the range of one to the maximum number of lines plotted. Block 120 prompts the user for the new line type value and new curve type value. Blocks 121, 122 and 123, as previously discussed, determine how to apply new line type and curve type.

The "G" command (9G), also shown in FIG. 3G is executed via block 124 and is used to change the grid format. The user selects the number of major and minor tick marks and the frequency of grid lines on both axes. Via block 125 the "H" Command (9H) is effected. The "H" command is used to terminate the tablet command mode, the tablet mode being analogous to the screen mode in the context of the command and coordinate entry. The "K" or kill command (9K) is executed via block 126 and 127 and is similar to the "D" or delete command except that the "K" command deletes the entire line.

Figure 3H:
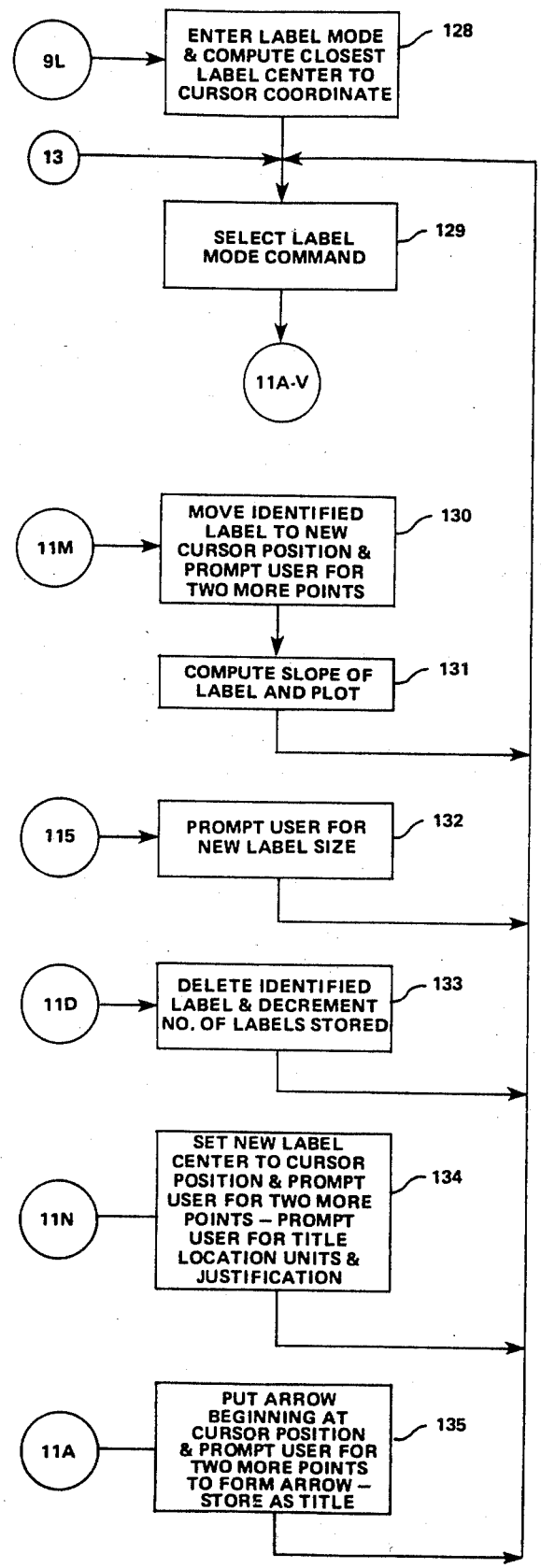

Referring now to FIG. 3H, the "L" command (9L) enters the label mode via block 128. The label mode keys a new set of single key commands which only affect labeling of the plot. The initial "L" command enters the label mode and uses the coordinate position to compute the closest label. The following is a summary of label mode commands:

| LABEL MODE COMMAND SUMMARY | |
|---|---|
| COMMAND | DESCRIPTION |
| L | Identify closest label and plot point showing its reference point |
| M | Move identified label to indicated cursor position |
| S | Change label size |
| D | Delete label |
| Q | Quit label mode return to coordinate mode |
| N | Add new label at current cursor position |
| A | Add arrow to plot |
| P | Print current identified label |
| C | Copy identified label to new cursor position |
| V | Move label to new vertical position |
| H | Move label to new horizontal position |

These label mode commands, like the coordinate mode commands, are prefixed by the number "11" for designation in the drawing figures and are described hereinbelow.

In accordance with the "M" label mode command (11M), the user moves an identified lable to a described position using cursor 20. The user is then prompted for two more coordinate points. These points are used to compute the slope of the label in block 131. The label is then printed at the indicated position along the new slope. Block 132 represents the "S" label mode command (11S) used to change the size of a label. Block 132 also checks to insure that a label has been identified using the initial "L" command. Block 133 executes the "D" label mode command (11D), deleting the previously identified label. The "N" label mode command (11N) executed via block 134 inputs a new label and its attributes, i.e., justification and storage. Block 134 also prompts the user for 2 additional points required for slope computation. In block 135, the "A" label mode command (11A) is implemented. The user positions the cursor 20 at the arrow tail (non-pointed end) and keys "A". Two additional points are requested giving a broken arrow with the final point as the arrow head.

Figure 3I:
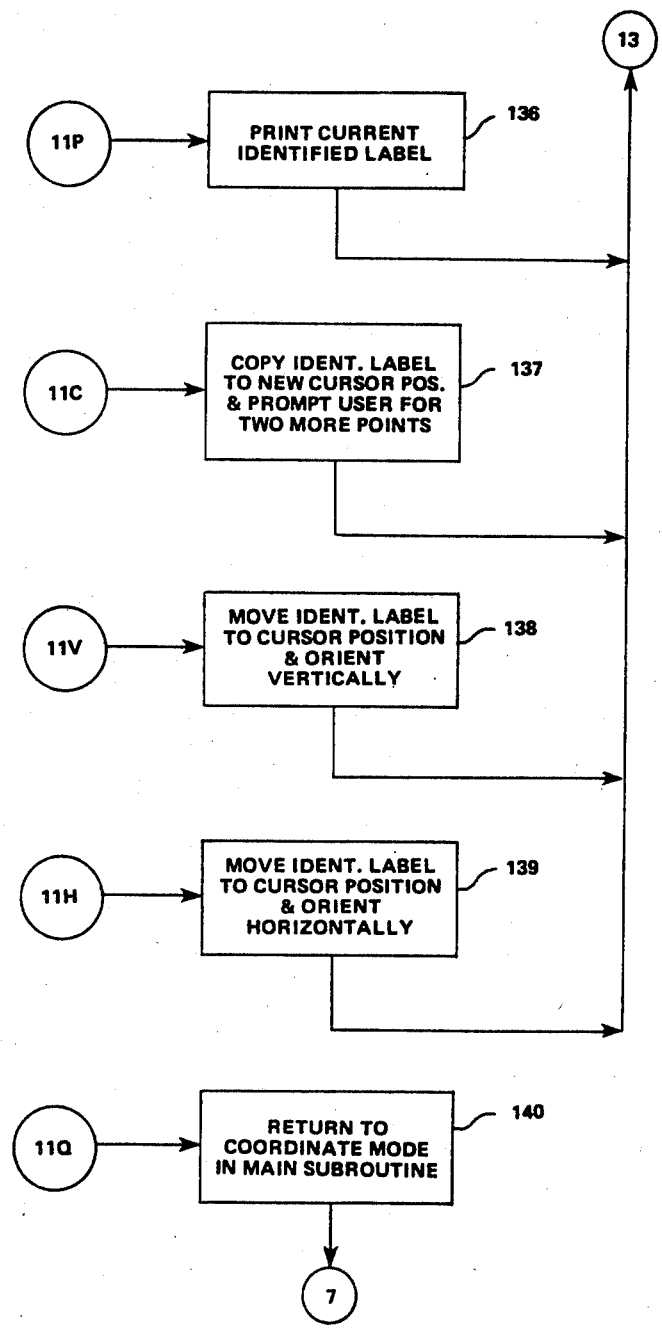

Referring now to FIG. 3I, block 136 affects a "P" or print label command (11P). In accordance with block 136, the current located label is re-printed. This provides a means for the user to identify which label is located when the initial "L" command is sued in clustered labels. Block 137 implements the "C" label mode command (11C), generating a copy of the identified label and promptly the user for two additional points to define the slope of the new copied label. The "V" label mode command (11V) implemented via block 138 is a quick label move to the indicated position, with the orientation vertical, reading from the bottom to the top on right side. Similarly, block 139 executes the "H" habel mode command (11H), performing an analogous label move, with the label set horizontal. Both the "V" and "H" label mode commands in blocks 138 and 139 are fast versions of the previously described "M" label mode command (11M). Block 140 represents the "Q" label mode command (11Q) that exits the label mode and returns the user to the coordinate command mode.

Figure 3J:
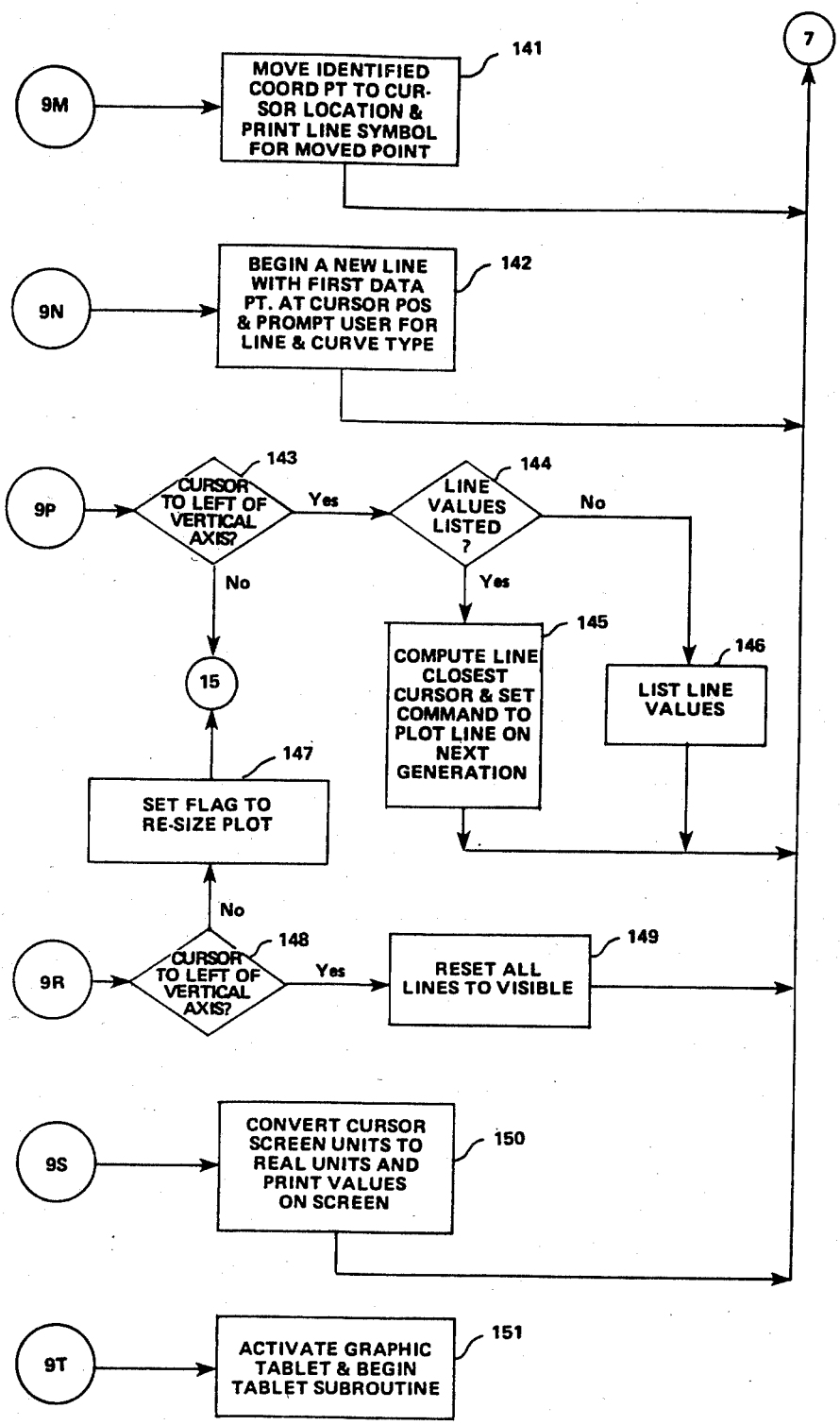

Referring now to FIG. 3J, the remainder of the coordinate commands are shown. In block 141, the "M" coordinate command (9M) is executed, moving the previously identified coordinate point to a position as indicated by cursor 20. Block 141 also checks to insure that a previous point has been identified as the reference point via the "C" coordinate command and block 104. Block 142 prompts the user for a new line value as well as line and curve type in accordance with the "N" coordinate command (9N). The coordinate point at the cursor 20 is identified as the first point of the new curve. In addition the reference point is automatically set to the new point.

The "P" plot coordinate command (9P) is executed in a series of steps represented by blocks 143-146. The first step of the "P" coordinate command, taken in block 143, is to determine the vertical position of the cross-hair cursor 20. If the position is to the right of the vertical axis, then control is transferred to block 65 to FIG. 3A, causing the graphics code to replot the data. If the cursor 20 is to the left of the vertical axis then further checks are performed. In block 144, a check is made to see if the line values and symbols have been already listed, i.e., in column format, left of vertical axis. Block 147 lists these line values and symbols if they have not been listed and in block 145 the line value of the closest line, listed in block 146, to the cursor 20 is determined. This closest line is toggled to plot in the next "P" command, and gives the user the capability to edit, plot and correct several lines overlapping on each other by plotting each one separately. The "P" command based on position of cursor 20 left of the vertical axis, can be thought of as a pick to live to plot command. In block 148 the "R" or restore/reset coordinate command (9R) is initiated. As with the "P" command and block 143, the vertical coordinate position of cursor 20 is used to determine the effect of the command. To the left of the vertical axis, the "R" command restores all lines to plot visibility. To the right, the "R" command resizes the plot to fit the minimum and maximum values contained within the coordinate data. In block 150, the "S" or "show" coordinate command is executed, the coordinate values being used to compute the actual real units at the cross-hair location of cursor 20 and these values being displayed on the screen 14. In block 151, the control is transferred, in accordance with the "T" coordinate command (9T), to the graphics tablet using a "mouse" to position and key coordinate commands.

Figure 3K:
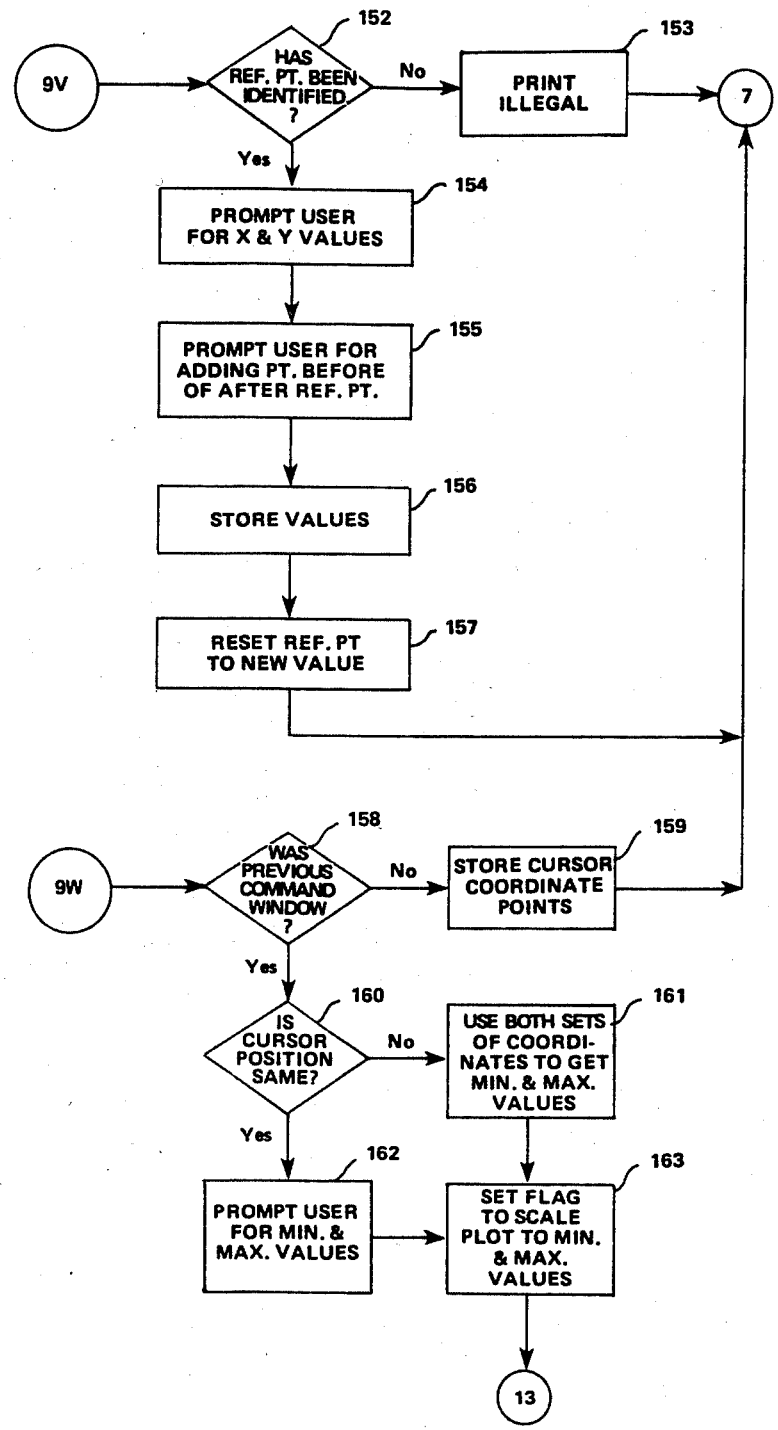

In FIG. 3K, block 152 initiates the "V" coordinate command (9V). The "V" command is similar to the "A" or add point command except that the user directly inputs the exact values. Block 152 checks for a reference point and block 154 prompts the user for one set of coordinate values. Block 155 prompts the user to store before or after the reference point. Block 157 resets the new point to the reference point and transfers to the next command. Block 158 initiates the "W" or window coordinate command. In this command, the user is prompted for two sets of coordinate points from which a rectangular window is formed and the plot size enlarged to fill screen 14 with data in that window. Block 158 gets the first set of coordinate points and block 160 checks for closeness of the two sets of coordinate points. Block 161 uses the two sets and redraws the plot enlarged on that window. Block 162 is transferred to when the user has not moved the cursor 20 for the second set of coordinate points, implying that direct input of window coordinate points is being requested. Block 162 performs this request. Block 163 computes minimum and maximum values and transfers to replot the data with the newly specified minimum and maximum.

Figure 3L:
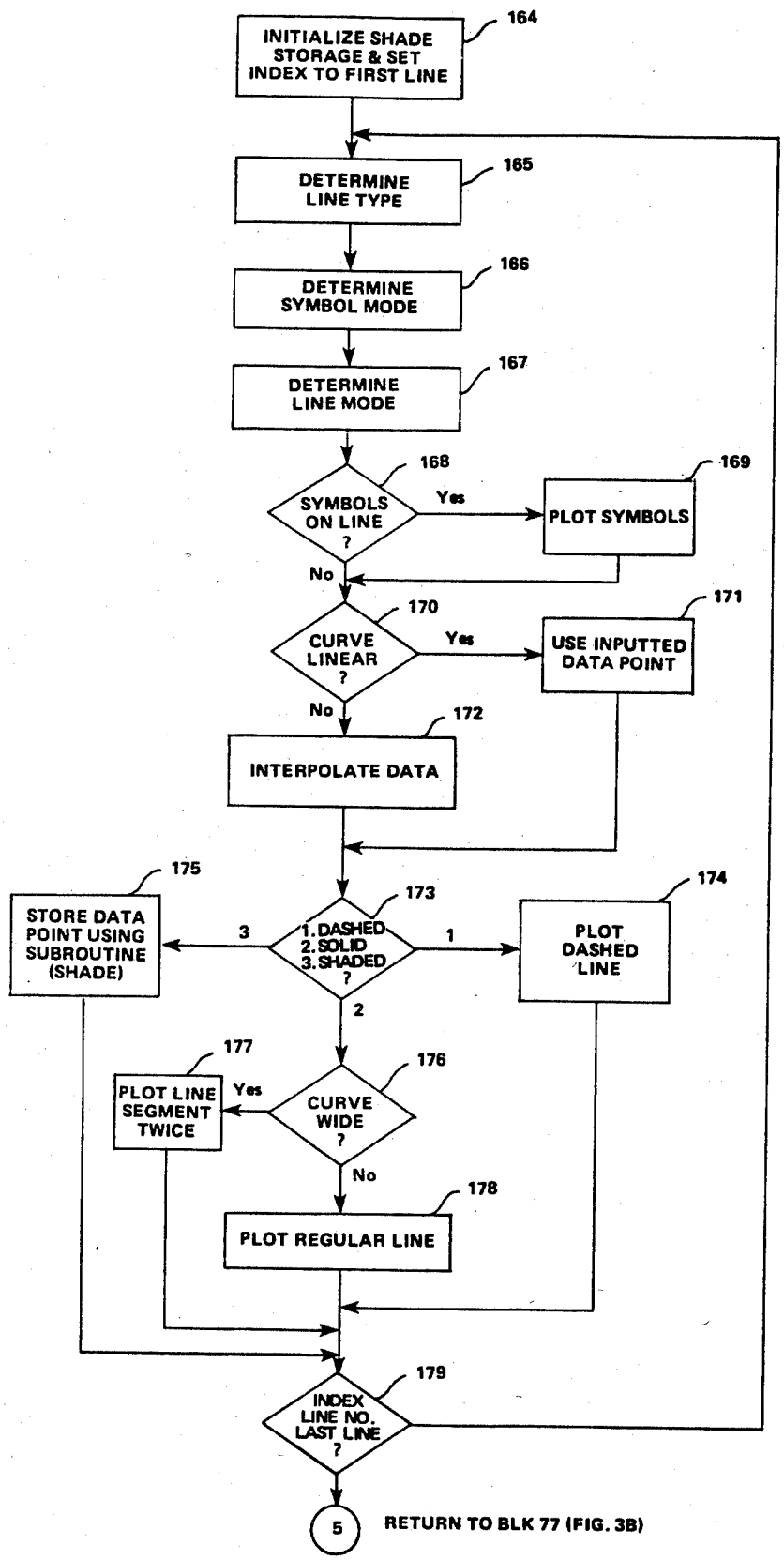

Referring now to FIG. 3L, the DRAWIT subroutine is shown. In block 164 the shading storage, a bit map representation of the entire screen 14 is set to zero i.e., no shade. Block 165 determines the line type, curve or linear, and block 166 plots the symbols, if required. Block 167 determines the line mode, solid or dashed. Block 168 begins to plot the curve, determining if symbols at each coordinate point are required, and block 169 instructs the plotting of the symbols. Via block 170, if the curve type is linear, then a straight line is drawn between data points. Data interpolation using the Hiroshi Akima technique is executed via block 172, using all the points on the given line and generating short line segments. Block 173 determines the type of line, i.e., dashed, solid or shaded. Block 174 plots the line as dashed using one of several different pre-programmed dash sequences. Block 175 imposes the shading on the plot using the following algorithm: in block 164, a bit map representation of the plot is initialized (about 20,000 points per plot); as the curve in which shading was requested is drawn, the points in the columns beneath the curve are examined; if a point (single bit) is not already shaded (bit is zero), then it is set to shade (bit set to 1); conversely if the bit is set to shade (bit equals 1), then it is reset to no shade (bit equals 0). This algorithm permits any shape defined by a curve, open or closed to be shaded. Further related discussion is found hereinafter regarding the subroutine SHADE. Block 176 determines if the wide solid line is required and block 177 plots the wide curve by performing a "hem stitch" motion as the curve is drawn. Block 178 simply draws the regular line, single width. Block 179 checks to see if any more lines are to be drawn, and if not returns control to block 77 in FIG. 3B.

Figure 3M:
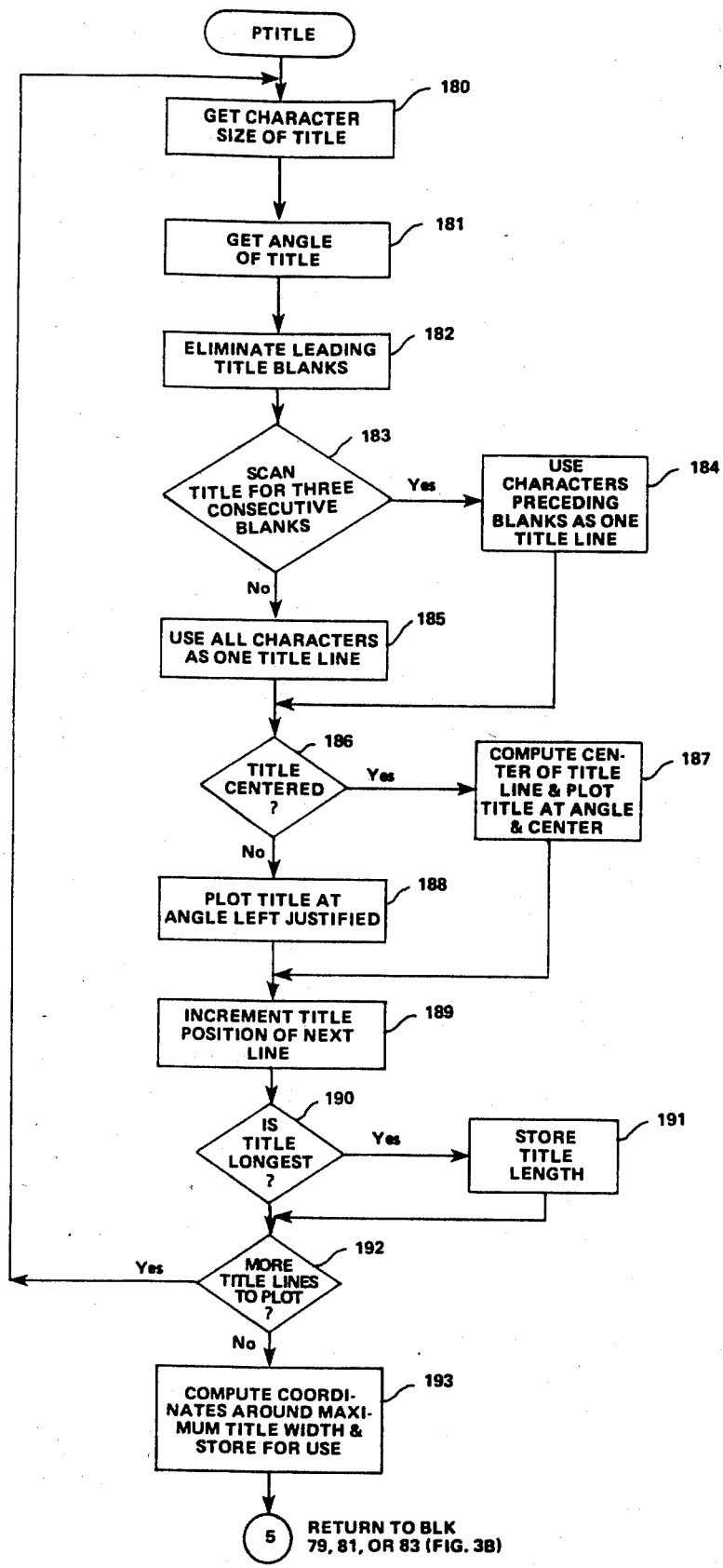
Figure 3N:
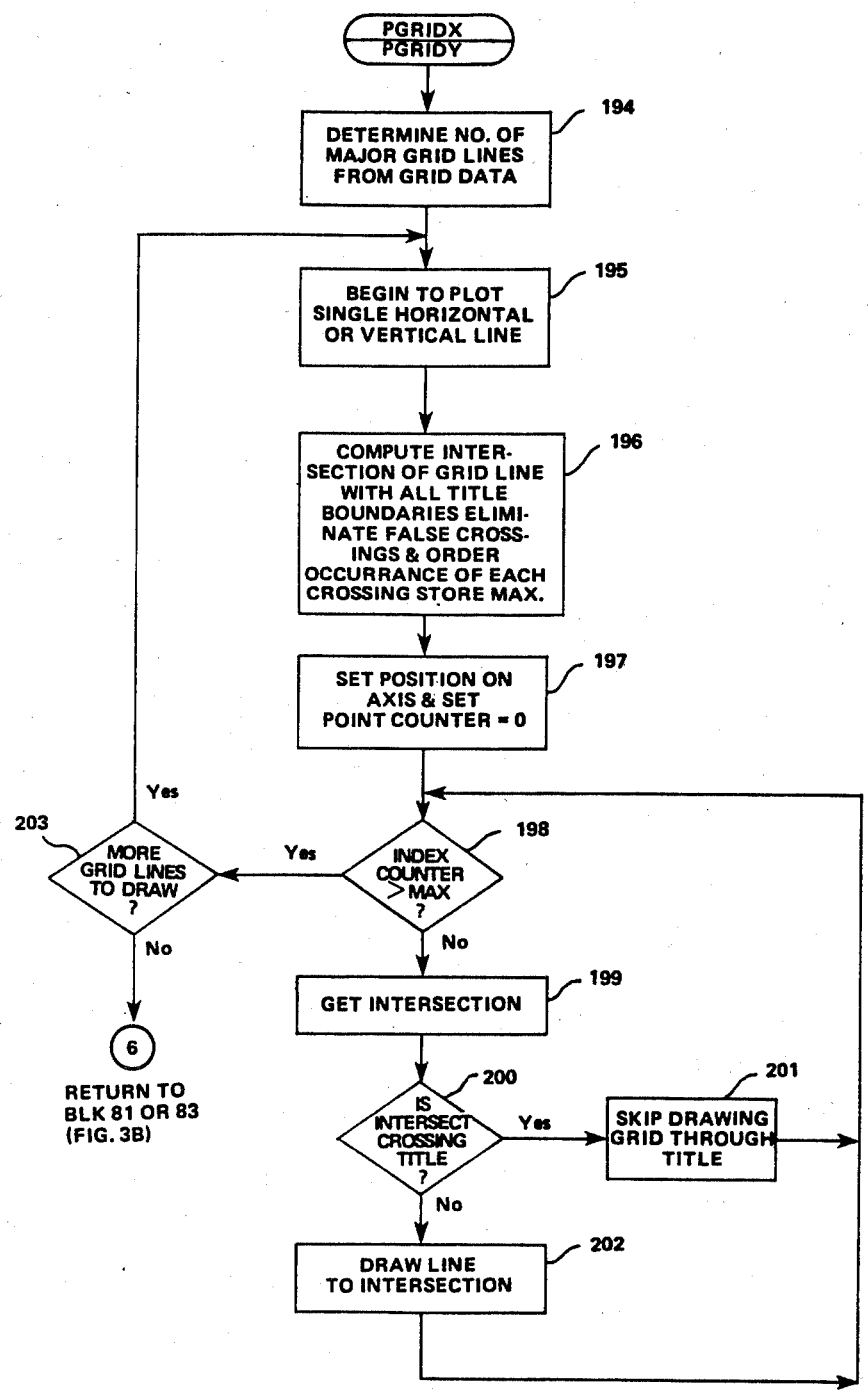
Figure 3P:
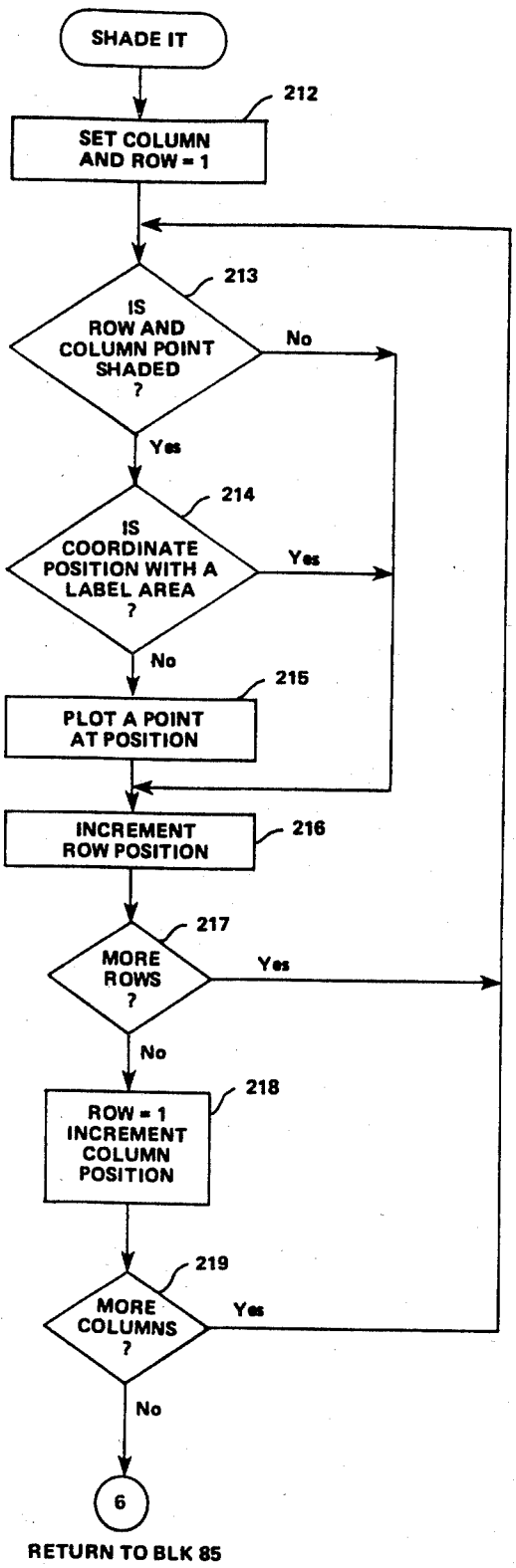

Referring now to FIG. 3M, the PTITLE subroutine (plot titles) is shown. Block 180 gets the size of the title as inputted or changed by the user. Block 181 uses the two slope points also inputted by the user to compute the title angle. Block 183 eliminates all leading blanks from the label. Block 183 begins scanning the title for three consecutive blanks used as a signal to terminate this line and begin a new line. Block 184 does the termination. Likewise, if the scan does not find three consecutive blanks, then the entire title is assumed on one line. Block 186 checks user input to see if title is centered or left shifted. Block 189 plots the title and increment to the next line. Block 190 checks the length of the line and stores the maximum line length. Block 192 checks for more title lines in the same title and transfers when finished to block 193. Block 193 stores the maximum line length and computes four coordinates around the title and stores these for later use. FIG. 3N shows the flow for the grid drawing subroutine PGRIDY/PGRIDX. Block 194 determines which grid lines are to be drawn. Block 195 moves into position to begin the grid line on either axis. Block 196 computes all possible intersections of this line with all title boundaries as determined in the PTITLE routine of FIG. 3M. False crossings are eliminated and the sequence of real crossings is stored in the order of crossing. Block 197 initializes the position and counter while block 198 determines if the end of the current grid line is reached. Block 203 checks for more grid lines if the current end is reached. Block 199 computes the next intersection of the grid line with the next title boundary it crosses and block 200 checks to see if drawing from the current position to intersection is crossing a title block. If it is, then block 201 skips drawing and moves to the computed intersection. Block 202 is used to draw a line to the intersection when a line is not passing thru title. This process is repeated looping back thru to block 198 until the end of the current grid line is reached.

Referring now to FIG. 3O, the SHADE subroutine is described. Block 204 checks for the first point of a line segment and block 205 stores it. In succeeding passes thru SHADE control is transferred to block 206. Block 206 takes two points and examines all columns of points between the X-axis and the line spanning the interval of the points. Within each column beneath this interval each possible shade point is checked. If the point is already shaded, it is unshaded and similarly, a point unshaded is shaded. This process is repeated until the line is traversed to its end. Also in FIG. 3O, the AXIS subroutine is shown. Block 211 uses the minimum and maximum values determined from the coordinate data and generates sealing in a multiple of 1, 2 or 5 units. Tick marks and numbers required on axis are computed and plotted.

Referring now to FIG. 3P, subroutine SHADEIT is shown. SHADEIT actually plots the points assembled with the SHADE subroutine shown in FIG. 3O. The exception is that points within a title block are omitted from shading. Block 212 sets the column row position and begins checking all 20,000 possible points. Block 213 checks point for shade. If point is shaded block 214 checks to see if shaded point is within label. If not, block 215 plots the point and block 216 increments the row counter. Block 217 checks for more rows and block 218 resets to Row 1 and moves to the next column. Block 219 then checks for more columns, and if none are found, return to block 85.

Therefore, it is apparent that the present invention provides an improved process implemented by a computer for generating graphical artwork of a finished quality ready for photolithographic reproduction. More particularly, the present invention provides a computer-aided process for producing original camera-ready plots in full detail without requiring any manual drafting. Furthermore, the disclosed invention provides an automated process for creating revised camera-ready graphical plots that permits custom editing and correcting of existing plots quickly and precisely without manually redrawing revisions and affixing them to existing plots. In addition, the disclosed computer-aided process for graphical artwork generation is cost effective, reliable in performance, easily adapted to existing automated graphic art equipment.

Obviously, other embodiments and modifications of the present invention will readily come to those of ordinary skill in the art having the benefit of the teachings presented in the foregoing description and drawings. It is therefore to be understood that various changes in the details, materials, steps, and arrangement of parts, which have been described and illustrated to explain the nature of the invention, may be made by those skilled in the art within the principle and scope of the invention as expressed in the appended claims.

APPENDIX
FORTRAN LISTING

CUTIGS
```
                                                                TIGS000
C*** USE P4662 PROC FILE
      PROGRAM UTIGS(INPUT=101,OUTPUT,TAPE1=101,TAPE7=101,TAPE5=INPUT)   TIGS0003
C *********************************                                    TIGS0004
C****                                                                  TIGS0005
C****      ULTRA TIGS TPLOT INTERACTICE GRAPHICS SYSTEM
C****                                                                  TIGS0007
C**** M CADDY REVISED SEP 82
      COMMON/ITITLE/ITT(50),JTT(50),KTT(50),LTT(50),MTT(50),STT(50),
     1 XTT(50),YTT(50),XUU(50),YUU(50),XVV(50),YVV(50),ITC(8,50),NTITE
     2 ,AXMIN,AYMIN,AXMAX,AYMAX,IXDEN,IYDEN,IGRIDX,IGRIDY,ITMX,ITMY,
     3 ICHAR,IWIN
      DIMENSION LT(7),XV(50),NPTS(50),X(1000),Y(1000),Z(50),A(200)
      DIMENSION IRATE(4)
      DATA NPLOT/0/                                                    TIGS0010
      DATA NPTS,XV/50*0,50*0./                                         TIGS0013
      DATA IEND/10HEOT      /                                          TIGS0014
      DATA IRATE/120,240,480,960/
   10 FORMAT(A5,7A10)                                                  TIGS0015
      REWIND 1                                                         TIGS0016
      REWIND 7                                                         TIGS0017
      PRINT *,"UTIGS VER 1.0 02-08-83   DEFAULT IS 9600 BAUD"
      PRINT *,"AND MAXIMUM DECIMALS ON TAPE7 OUTPUT"
      PRINT *, "ENTER C R> TO CHANGE OR  R> TO CONTINUE"
      IBR=960
      IDFLT=1
      READ 30,IBZ
      IF(EOF(5).NE.0.)GO TO 29
      IDFLT=0
      PRINT 21
   21 FORMAT(* ENTER BAUD RATE CODE *,/,
     1 * 1=1200; 2=2400, 3=4800, 4=9600*)
      CALL GETIN(1,Z(1))
      IER=Z
      IER=MAX0(1,MIN0(IER,4))
      IER=IRATE(IBR)
C****                                                                  TIGS0024
C****       FILE IS NOT BEING CREATED READ IT FROM TAPE1                TIGS0025
C****                                                                  TIGS0026
   29 IC=0
   30 FORMAT(1R1)
   31 READ (1,10) LNC,LT                                               TIGS0027
      IF(EOF(1).EQ.0.)GO TO 32
      IC=1
      PRINT *,"CREATION MODE"
      GO TO 40
   32 IF(LNC.EQ.10H         ) GO TO 251
C****                                                                  TIGS0028
C****       CALL IN Z VALUES                                           TIGS0029
C****                                                                  TIGS0030
      CALL TABR(LZ,L,MT,NZ,Z,1)
C****                                                                  TIGS0032
C****       READ IN Y,X,FXYZ DATA FOR NON CREATION RUN                  TIGS0033
C****                                                                  TIGS0034
      CALL TABR(LY,L,MT,NY,A,1)
      CALL TABR(LX,L,MT,N,X,1)
C*** SAVE STORAGE LOCATION OF LAST X VALUE
      JXS=0
```

```
      CALL TAER(LF,L,MT,N,Y,1)
      MTT(1)=MT
      LTT(1)=L
      GO TO 100
   40 PRINT 50
   50 FORMAT(* ENTER TABLE TITLE CARD*/,
     1 * (COLUMNS 1-5 SHOULD BE THE TABLE REFERENCE NUMBER)*)
      READ 10,LNC,LT
C****
C****      READ TABLE NUMBER AND TITLE
C****
      PRINT 60
   60 FORMAT(* ENTER 4 CHARACTERS FOR EACH LABEL FOR Z,Y,X,FXYZ*/
     1 * (SEPARATED BY COMMAS)*)
C****
C****      READ TITLES FOR EACH VARIABLE 4 CHARACTERS LONG
C****
      READ 70,LZ,LY,LX,LF
   70 FORMAT(4(A4,1X))
C****
C****      GET NUMBER OF Z VARIABLES AND VALUES
C****
      PRINT 80,LZ
   80 FORMAT(* ENTER NUMBER OF *,A4,* VARIABLES--- FREE FORM*)
      CALL GETIN(1,Z)
      NZ=Z(1)
      PRINT 90,LZ
   90 FORMAT(* ENTER *,A4,* VALUES ,ASCENDING ORDER--FREE FORM*)
      CALL GETIN(NZ,Z)
C****
C****      WRITE TO TAPE7 TITLE CARD AND TABLE NUMBER
C****
  100 WRITE(7,10) LNC,LT
      IOPTD=0
      IF(IDFLT.EQ.1)GO TO 99
      PRINT 101
  101 FORMAT(* WANT TO SPECIFY DECIMAL PLACES ON TAPE7?*)
      READ 30,IOPTD
   99 DO 102 ISET=1,4
  102 XV(ISET)=0.
      IF(IOPTD.NE.31B)GO TO 115
      PRINT 110,LZ,LY,LX,LF
  110 FORMAT(* ENTER NUMBER OF DECIMAL PLACES FOR *,4(A4,1X)
     1 ,* FREE FORM*)
C****
C****      GET NUMBER OF DECIMAL PLACES FOR EACH VARIABLE
C****
      CALL GETIN(4,XV)
  115 LZDP=XV(1)
      LYDP=XV(2)
      LXDP=XV(3)
      LFDP=XV(4)
C****
C****      WRITE TO TAPE7 THE Z VALUES ETC...
C****
      CALL TFORM(1,LZ,NZ,0,0,Z,LZDP,7)
C****
C****      INIALIZE TEK SOFTWARE
C****
      CALL INITT(IBR)
      CALL TERM(3,4096)
      CALL CHRSIZ(4)
```

```
      NTITE=0
      DO 250 IZ=1,NZ                                                        TIGS0089
      IWIN=0
C****                                                                       TIGS0090
C****        IF CREATION MODE THEN SET DEFAULTS TO 0                        TIGS0091
C****                                                                       TIGS0092
      IF(IC.NE.1) GO TO 120                                                 TIGS0093
      NPTS(1)=0                                                             TIGS0094
      X(1)=0.                                                               TIGS0095
      Y(1)=0.                                                               TIGS0096
      GO TO 210                                                             TIGS0097
C****                                                                       TIGS0098
C****        NON CREATION MODE                                              TIGS0099
C****                                                                       TIGS0100
  120 CONTINUE                                                              TIGS0101
      K=1                                                                   TIGS0102
C****                                                                       TIGS0103
C****        TRANSFER SECOND INDEPENDENT VARIABLE TO XV ARRAY               TIGS0104
C****                                                                       TIGS0105
      DO 129 J=1,50
  129 XV(J)=0.
      DO 130 J=1,NY                                                         TIGS0106
  130 XV(J)=A(J)                                                            TIGS0107
      LNX=N                                                                 TIGS0111
      LNY=N                                                                 TIGS0112
      NPTS(1)=N                                                             TIGS0113
      NPTS(2)=0                                                             TIGS0114
      IF(IZ.EC.1) GO TO 150
      LNX=0
      LNY=0
      K=0
C****                                                                       TIGS0115
C****        READ NEXT SET                                                  TIGS0116
C****                                                                       TIGS0117
  150 READ (1,188) LABI,ITI,JTI,KTI,(A(I),I=1,7)
  188 FORMAT(A4,3I1,3X,7F10.4)
      IF(LABI.EC.4H....)GO TO 189
      IF(LABI.NE.4H...C) GO TO 187
      READ (1,*)IXDEN,IYDEN,ITMX,ITMY,IGRIDY,IGRIDX,AXMIN,AYMIN,
     1AXMAX,AYMAX
      IWIN=1
      GO TO 150
  187 BACKSPACE 01
      GO TO 149
  189 NTITE=NTITE+1
      IF(NTITE.LE.50)GO TO 500
      CALL ANMODE
      PRINT *,"WARNING 50 LABEL MAX HAS BEEN EXCEEDED UTIGS ABORTED"
      STOP
  500 READ (1,191) (ITC(I,NTITE),I=1,8)
  191 FORMAT(8A10)
C****
C**** ITT= FLAG =1 TITLE NOT CENTERED =0 TITLE IS CENTERED
C**** JTT= UNITS FLAG =1 USE REAL UNITS =0 USE SCREEN UNITS
C**** KTT= FLAG KTT=1 TITLE IS AN ARROW
C**** THE NEXT 6 INPUTS ARE 3 PAIRS OF COORDINATES
C**** THE FIRST = X,Y CENTERED PAIR
C**** THE SECOND IS A VECTOR USED FOR THE SLOPE
C**** THE THIRD IS ONLY USED FOR THE ARROW
C**** IF ARROW THE SECOND IS USED AS THE SECOND (KNEE) POINT
C**** OF THE ARROW.
      ITT(NTITE)=ITI
```

```
        JTT(NTITE)=JTI
        KTT(NTITE)=KTI
        STT(NTITE)=A(1)
        XTT(NTITE)=A(2)
        YTT(NTITE)=A(3)
        XUU(NTITE)=A(4)
        YUU(NTITE)=A(5)
        XVV(NTITE)=A(6)
        YVV(NTITE)=A(7)
        GO TO 150
    149 CALL TABR(LW,L,MT,N,A,1)
C****                                                              TIGS0119
C****       CHECK FOR NEXT Z GROUP                                 TIGS0120
C****                                                              TIGS0121
        IF(LW.NE.LY) GO TO 151                                     TIGS0122
        NY=N
        GO TO 210
C****                                                              TIGS0123
C****       CHECK FOR END OF TABLE                                 TIGS0124
C****                                                              TIGS0125
    151 IF(LW.EQ.4HECT ) GO TO 210                                 TIGS0126
C****                                                              TIGS0127
C****       CHECK FOR NEXT X DATA                                  TIGS0128
C****                                                              TIGS0129
        IF(LW.NE.LX) GO TO 170                                     TIGS0130
C****                                                              TIGS0131
C****       DATA IS X DATA STORE IT                                TIGS0132
C****                                                              TIGS0133
        JXS=LNX
        DO 160 J=1,N                                               TIGS0135
        LNX=LNX+1                                                  TIGS0136
    160 X(LNX)=A(J)                                                TIGS0137
        GO TO 150                                                  TIGS0138
C****                                                              TIGS0139
C****       DATA HAD BETTER BE LY                                  TIGS0140
C****                                                              TIGS0141
    170 IF(LW.NE.LF) STOP                                          TIGS0142
C****                                                              TIGS0143
C****       IF DATA HAS NOT BE INPUT FOR X DATA USE LAST VALUES    TIGS0144
C****                                                              TIGS0145
        IF(LNX.GT.LNY) GO TO 190                                   TIGS0146
        LJS=JXS
        DO 180 J=1,N                                               TIGS0148
        LNX=LNX+1                                                  TIGS0149
        LJS=LJS+1
    180 X(LNY)=X(LJS)                                              TIGS0151
C****                                                              TIGS0152
C****       UPDATE COUNTERS                                        TIGS0153
C****                                                              TIGS0154
    190 K=K+1                                                      TIGS0155
        NPTS(K)=N                                                  TIGS0156
        NPTS(K+1)=0                                                TIGS0157
C****                                                              TIGS0158
C****       LOAD Y DATA                                            TIGS0159
C****                                                              TIGS0160
C*** CHECK FOR 50 LINE LIMIT
C****
        IF(K.NE.49) GO TO 202
        CALL ANMODE
        PRINT *,"NUMBER OF LINES EXCEED 49 UTIGS ABORTED"
        STOP
```

```
    202 IF(LNY+N.LE.1000) GO TO 199
        CALL ANMODE
        PRINT *,"NUMBER OF POINTS EXCEED 1000 LIMIT UTIGS ABORTED"
        STOP
    199 DO 200 J=1,N                                                   TIGS0161
        LNY=LNY+1                                                      TIGS0162
    200 Y(LNY)=A(J)                                                    TIGS0163
        MTT(K)=MT
        LTT(K)=L
C****                                                                  TIGS0164
C****        GO BACK TO GET NEXT GROUP                                 TIGS0165
C****                                                                  TIGS0166
                                                                       TIGS0167
        GO TO 150                                                      TIGS0168
C****                                                                  TIGS0169
C****        PLOT DATA                                                 TIGS0170
C****
    210 IGRID=L                                                        TIGS0171
        CALL TIGPPR(NPLOT,LF,1,LX,1,LT,7,X,Y,NPTS,LY,1,XV,LYDP,ITIP,   TIGS0172
       1 IGRID,LZ,Z(IZ))
        CALL ANMODE                                                    TIGS0173
C****                                                                  TIGS0174
C****        COUNT NUMBER OF Y VALUES                                  TIGS0175
C****                                                                  TIGS0176
        JY=0                                                           TIGS0177
        DO 220 I=1,50                                                  TIGS0178
        IF(NPTS(I).EQ.0) GO TO 230                                     TIGS0179
        JY=JY+1                                                        TIGS0180
    220 CONTINUE                                                       TIGS0181
        GO TO 250                                                      TIGS0182
C****                                                                  TIGS0183
C****        WRITE TO TAPE7 Y DATA ETC....                             TIGS0184
C****                                                                  TIGS0185
    230 CALL TFORM(1,LY,JY,0,0,XV,LYDP,7)
        LOC=1                                                          TIGS0187
        J=0                                                            TIGS0188
    240 J=J+1                                                          TIGS0189
        NP=NPTS(J)                                                     TIGS0190
        IF(NP.EQ.0) GO TO 250                                          TIGS0191
C****                                                                  TIGS0192
C****        WRITE TO TAPE7 X DATA ETC...                              TIGS0193
C****                                                                  TIGS0194
        CALL TFORM(LOC,LX,NP,0,0,X,LXDP,7)
C****                                                                  TIGS0196
C****        WRITE TO TAPE7 Y DATA ETC...                              TIGS0197
C****                                                                  TIGS0198
        CALL TFORM(LOC,LF,NP,LTT(J),MTT(J),Y,LFDP,7)
        LOC=LOC+NP                                                     TIGS0200
        GO TO 240                                                      TIGS0201
    250 CONTINUE                                                       TIGS0202
        WRITE(7,188)4H...C
        WRITE(7,*)IXDEN,IYDEN,ITMX,ITMY,IGRIDY,IGRIDX,AXMIN,AYMIN,
       1AXMAX,AYMAX
C*** CHECK FOR TITLES IN FILE
        IF(NTITE.LT.1) GO TO 310
        LABI=4H....
        DO 300 I=1,NTITE
        WRITE(7,188)LABI,ITT(I),JTT(I),KTT(I),STT(I),XTT(I),YTT(I),XUU(I),
       1 YUU(I),XVV(I),YVV(I)
    300 WRITE(7,191) (ITC(J,I),J=1,8)
    310 WRITE (7,10) IEND                                              TIGS0203
C****
C**** IF NON CREATION MODE THEN GO BACK TO READ NEXT TITLE
```

```
C****
      IF(IC.NE.1) GO TO 31
  251 WRITE (7,10)                                              TIGS0204
      REWIND 7                                                  TIGS0205
      END                                                       TIGS0206
CTFORM
                                                    TFOR0001
      SUBROUTINE TFORM(LCC,LAB,N,L,LM,X,IPI,K)
      DIMENSION X(1),IFORM(4)                                   TFOR0003
C****      FORMATTING SUBROUTINE FOR TPLOT FORMAT               TFOR0004
C****      LCC IS THE LOCAL ARRAY POSITION TO PRINT FROM        TFOR0005
C****      LAB IS THE 4 CHARACTER LABEL                         TFOR0006
C****      N IS THE NUMBER TO PRINT                             TFOR0007
C****      X IS THE ARRAY CONTAINING THE VALUES                 TFOR0008
C****      IP IS THE NUMBER OF DECIMAL PLACES TO USE IN FORMAT  TFOR0009
C****      IF IP=0 THEN MAXIMUM NUMBER OF DECIMAL PLACES WILL RESULT
      IP=IPI
      IF(IP.NE.0)GO TO 20
      XMAX=0.
      IF(N.LE.1)GO TO 20
      DO 10 I=1,N
      IF(X(I).EQ.0.)GO TO 10
      XC=ALOG10(ABS(X(I)))
      IF(XC.GT.XMAX) XMAX=XC
   10 CONTINUE
      IP=7-IFIX(XMAX)
   20 IF(IP.LT.0) IP=0                                          TFOR0010
      IF(IP.GT.7) IP=7                                          TFOR0011
      JO=LCC-1                                                  TFOR0012
      IFORM(1)=10H(A4,I3,
      IFORM(3)=24343456420634335733D+IP                         TFOR0016
      IFORM(4)=10H))
      IF((L+LM).EQ.0)GO TO 30
      IFORM(2)=10HI1,I2,(
      WRITE(K,IFORM) LAB,N,L,LM,(X(I+JO),I=1,N)
      RETURN
   30 IFORM(2)=10H    3X,(
      WRITE(K,IFORM) LAB,N,(X(I+JO),I=1,N)
      RETURN                                                    TFOR0021
      END                                                       TFOR0022
CTAER
                                                    TAER0001
      SUBROUTINE TABR(LAB,L,MT,N,A,K)
      DIMENSION A(1)
      READ(K,10) LAB,N,L,MT,(A(I),I=1,7)
   10 FORMAT(A4,I3,I1,I2,7F10.0)
      IF(N.GT.7) READ(K,20) (A(I),I=8,N)
   20 FORMAT(10X,7F10.0)
      RETURN
      END
CTIGP
                                                    TIGP0001
C                                                               TIGP0002
C         TEK INTERACTIVE GPPR   M CADDY FEB 78                 TIGP0003
C                                                               TIGP0004
      SUBROUTINE TIGPPR(NPLOT,LABY,N1,LABX,N2,LABTL,NT ,X,Y,    TIGP0005
     1 NPTA,LABVAL,NCC,VLABEL,NDECVIN,ITIP,IGRID,LZ,ZVAL)       TIGP0006
      COMMON/ITITLE/ITT(50),JTT(50),KTT(50),LTT(50),MTT(50),STT(50),
     1 XTT(50),YTT(50),XUU(50),YUU(50),XVV(50),YVV(50),ITC(8,50),NTITE
     2 ,AXMIN,AYMIN,AXMAX,AYMAX,IXDEN,IYDEN,IGRIDX,IGRIDY,ITMX,ITMY,
     3 ICHAR,IWIN
      COMMON/TKTRNX/ITEKC(60)                                   TIGP0009
```

```
      DIMENSION X(200),Y(200),LABTL(7),NPTA(50),VLABL(50),           TIGP0010
     1 LABX(5),LABY(5),VTEM(8),LABVAL(8),IQUICK(30),ISUB(1000),MSG7(29) TIGP0011
      DIMENSION MSG1(20),MSG2(22),MSG4(10),MSG5(10),MSG6(15),IALTM(6,2) TIGP0012
      DIMENSION IPPX(4,50),IPPY(4,50),XDUM(2)                    TIGP001
      EQUIVALENCE (BEG(1),XBEG),(BEG(2),YBEG)                         TIGP0014
      EQUIVALENCE (DEL(1),DELX),(DEL(2),DELY),(ITAB,LTV(2))           TIGP0015
      EQUIVALENCE (EN(1),XEND),(EN(2),YEND)                           TIGP0016
      EQUIVALENCE (IOFF,ITEKC(30)),(TXMIN,ITEKC(1))                   TIGP0017
C           SET LINE SPACING                                          TIGP0018
      COMMON/TEKGPPR/LDEL,LCNT,MAXSR,LTV(17),EN(2),DEL(2),BEG(2),RDX2, TIGP0019
     1RDY2,NLINE,NDRAW(50)                                            TIGP0020
      DATA MSG1/46,46,80,111,105,110,116,101,114,32,                  TIGP0021
     1        80,111,115,105,116,105,111,110,101,100/                 TIGP0022
      DATA MSG2/73,110,112,117,116,32,76,105,110,101,                 TIGP0023
     1        32,86,97,108,117,101,44,76,84,44,77,84/                 TIGP0024
C**** ILLEGAL MESSAGE                                                 TIGP0025
      DATA MSG4/42,73,108,108,101,103,97,108,42,32/                   TIGP0026
      DATA MSG5/73,110,112,117,116,32,88,44,89,32/                    TIGP0027
      DATA MSG6/65,32,111,114,32,66,32,109,111,100,                   TIGP0028
     1        101,63,32,32,32/                                        TIGP0029
      DATA MSG7/69,78,84,69,82,32,87,73,78,68,79,87,13,10,            TIGP0030
     1 68,73,65,71,79,78,65,76,32,80,79,73,78,84,83/                  TIGP0031
      DATA ((IALTM(I,J),I=1,6),J=1,2)/65,102,116,101,114,32,          TIGP0032
     1                        66,101,102,111,114,101/                 TIGP0033
      DATA IQUICK/0,0,1,1,2,3,10,4,0,0,                               TIGP0034
     1           11,12,0,5,0,6,0,7,8,0,                               TIGP0035
     2            0,0,9,0,0,0,0,0,0,0/                                TIGP0036
      IXTOS(X)=((X-BEG(1))/DELX+600)                                  TIGP0037
      IYTOS(Y)=((Y-BEG(2))/DELY+300)                                  TIGP0038
      LDEL=50                                                         TIGP0039
      ICHAR=0                                                         TIGP0040
      IF(IWIN.EQ.1)GO TO 5
      IGRIDX=IGRID                                                    TIGP0041
      IGRIDY=IGRID                                                    TIGP0042
C**** DEFAULT AXIS
      IXDEN=6                                                         TIGP0101
      IYDEN=8                                                         TIGP0102
      ITMX=0
      ITMY=0
    5 IF(NPLOT.GT.0) GO TO 20                                         TIGP0043
      DO 10 I=1,8                                                     TIGP0044
   10 LTV(I)=0                                                        TIGP0045
C**20 IWIN=0                                                          TIGP0046
   20 NPLOT=NPLOT+1                                                   TIGP0047
      KLAST=0
      NTL=NT                                                          TIGP0048
      NLINE=0                                                         TIGP0049
   30 NSTOR=0                                                         TIGP0050
C        SET STORAGE POINTER TO INITIAL SEQUENCE                      TIGP0051
      DO 40 I=1,999                                                   TIGP0052
   40 ISUB(I)=I+1                                                     TIGP0053
C                                                                     TIGP0054
C     MERGE HERE TO REPLOT                                            TIGP0055
C                                                                     TIGP0056
   50 CALL SWCHAR(1)                                                  TIGP0057
      LCNT=3120                                                       TIGP0059
C           SUM UP NUMBER OF POINTS                                   TIGP0060
      NL=0                                                            TIGP0061
      NPTOT=0                                                         TIGP0062
      DO 60 I=1,50                                                    TIGP0063
      N=NPTA(I)                                                       TIGP0064
      IF(N.EQ.0) GO TO 70                                             TIGP0065
```

```
          NL=NL+1                                                   TIGP0066
       60 NPTOT=NPTOT+N                                             TIGP0067
C           SET STORAGE LIMIT TO NPTOT FIRST PASS                   TIGP0068
       70 IF(NSTOR.EQ.0) NSTOR=NPTOT                                TIGP0069
          IF(NPTOT.GT.0)GO TO 90                                    TIGP0070
          NSTOR=0                                                   TIGP0071
          CALL MOVABS(0,LCNT)                                       TIGP0072
          CALL ANMODE                                               TIGP0073
          PRINT 80                                                  TIGP0074
       80 FORMAT(* NO DATA FOUND TO PLOT ..ENTER COMMAND*)          TIGP0075
          LCNT=LCNT-LDEL                                            TIGP0076
          IPLOT=0                                                   TIGP0077
          GO TO 280                                                 TIGP0078
       90 CONTINUE                                                  TIGP0083
          IDEN=0                                                    TIGP0085
C         PREPARE TEKTRONIX AGII COMMON                             TIGP0086
C                                                                   TIGP0087
          IPLOT=IPLOT+1                                             TIGP0089
          CALL CHRSIZ(2)                                            TIGP0093
          IF(ICHAR.NE.0) GO TO 120                                  TIGP0094
          CALL ANMODE                                               TIGP0095
          PRINT 110,LABTL                                           TIGP0096
      110 FORMAT(* NEXT PLOT IS *,/,9A10)                           TIGP0097
          IF(IWIN.NE.0)PRINT *,"GRID/WINDOW IS SET "
         1,IXDEN,IYDEN,ITMX,ITMY,IGRIDY,IGRIDX,AXMIN,AYMIN,
         2 AXMAX,AYMAX
          LCNT=LCNT-LDEL*3                                          TIGP0098
C****                                                               TIGP0099
C                                                                   TIGP0103
C         IF FIRST TIME AROUND.. GET COMMAND FIRST TO PLOT          TIGP0104
C                                                                   TIGP0105
C            SET SCREEN WINDOW SIZE                                 TIGP0106
      120 CALL SWINDO(600,3360,300,2400)
          IF(IWIN.EQ.0) GO TO 125                                   TIGP0110
C**** THIS SETS KLAST PARAMETER IF NOT SET
          IF(KLAST.NE.0)GO TO 140
          K=1
          DO 121 I=1,NPTOT
          KLAST=K
      121 K=ISUB(K)
          GO TO 140
      125 AXMAX=-1.E99                                              TIGP0111
          AYMAX=-1.E99                                              TIGP0112
          AXMIN=+1.E99                                              TIGP0113
          AYMIN=+1.E99                                              TIGP0114
C            SET MIN AND MAX DATA VALUES                            TIGP0115
          K=1                                                       TIGP0116
          DO 130 I=1,NPTOT                                          TIGP0117
          AXMIN=AMIN1(AXMIN,X(K))                                   TIGP0118
          AYMIN=AMIN1(AYMIN,Y(K))                                   TIGP0119
          AXMAX=AMAX1(AXMAX,X(K))                                   TIGP0120
          AYMAX=AMAX1(AYMAX,Y(K))                                   TIGP0121
          KLAST=K                                                   TIGP0122
C            SET KLAST TO END STORAGE VALUE                         TIGP0123
      130 K=ISUB(K)                                                 TIGP0124
          IWIN=1                                                    TIGP0125
      140 IF(AXMIN.NE.AXMAX) GO TO 150                              TIGP0126
          AXMIN=AXMIN-.5                                            TIGP0127
          AXMAX=AXMAX+.5                                            TIGP0128
      150 IF(AYMIN.NE.AYMAX) GO TO 160                              TIGP0129
          AYMIN=AYMIN-.5                                            TIGP0130
          AYMAX=AYMAX+.5                                            TIGP0131
```

```
    160 CONTINUE
        XDUM(1)=AXMIN
        XDUM(2)=AXMAX
        AXL=IXDEN
        CALL AXSCALE(XDUM,AXL,2,XBEG,DELXX,0)
        XEND=XBEG+AXL*DELXX
        XDUM(1)=AYMIN
        XDUM(2)=AYMAX
        AXL=IYDEN
        CALL AXSCALE(XDUM,AXL,2,YBEG,DELYY,0)
        YEND=YBEG+AXL*DELYY
C                                                                       TIGP0158
C       FIND VIRTUAL SPACE TO SCREEN SPACE SCALING PARAMETERS           TIGP0159
C                                                                       TIGP0160
        DELX=(XEND-XBEG)/3360.                                          TIGP0156
        DELY=(YEND-YBEG)/2400.                                          TIGP0157
        RDX2=1./(DELX*DELX)                                             TIGP0161
        RDY2=1./(DELY*DELY)                                             TIGP0162
C          SET VIRTUAL WINDOW                                           TIGP0132
        CALL DWINDO(XBEG,XEND,YBEG,YEND)
        IF(ICHAR.EQ.0)GO TO 280                                         TIGP0164
        CALL DRAWIT(NL,NPTA,X,Y,ISUB,MTT,LTT)                           TIGP0169
        CALL CHRSIZ(4)                                                  TIGP0168
        IF(IXDEN.LE.0)GO TO 172
        CALL AXIS
       1(600,300,3360,2400,IXDEN,0,XBEG,DELXX,EX,1,1,ITMX,0,.15)
    172 IF(IYDEN.LE.0)GO TO 174
        CALL AXIS
       1(600,300,3360,2400,IYDEN,1,YBEG,DELYY,EX,1,1,ITMY,0,.15)
    174 CALL SWCHAR(1)                                                  TIGP0170
        ICH=KIN(.15*.873)
        ICV=1.6*ICH                                                     TIGP0172
        CALL PLCHAR(ICH,ICV)                                            TIGP0173
        IF(IXDEN*IYDEN.EQ.0)GO TO 190
        CALL PTITE(2280,3000,NT,LABTL,0,50,0.,IPPX,IPPY)                TIGP0174
        IF(NTITE.GT.1) GO TO 180                                        TIGP0175
        CALL PTITE(300,1500,N1,LAEY,0,50,90.,IPPX,IPPY)                 TIGP0176
    180 IF(NTITE.GE.1) GO TO 190                                        TIGP0177
        CALL PTITE(2280,100,N2,LAEX,0,20,0.,IPPX,IPPY)                  TIGP0178
    190 IF(NTITE.EQ.0)GO TO 250                                         TIGP0179
        DO 240 II=1,NTITE                                               TIGP0180
        IF(KTT(II).EQ.0)GO TO 210                                       TIGP0181
C**** ARROW CODE                                                        TIGP0182
C**                                                                     TIGP0183
        IA1=IXTOS(XUU(II))                                              TIGP0184
        IA2=IYTOS(YUU(II))                                              TIGP0185
        IB1=IXTOS(XVV(II))                                              TIGP0186
        IB2=IYTOS(YVV(II))                                              TIGP0187
        CALL MOVEA(XTT(II),YTT(II))                                     TIGP0188
        CALL DARROW(IA1,IA2,IB1,IB2)                                    TIGP0189
        DO 200 JJ=1,4                                                   TIGP0190
        IPPX(JJ,II)=1000000000                                          TIGP0191
    200 IPPY(JJ,II)=1000000000                                          TIGP0192
        GO TO 240                                                       TIGP0193
    210 DANGX=(XVV(II)-XUU(II))*SQRT(RDX2)
        DANGY=(YVV(II)-YUU(II))*SQRT(RDY2)
        ANG=0.
        IF(DANGY.EQ.0..AND.DANGX.EQ.0.) GO TO 211
        ANG=ATAN2(DANGY,DANGX)*57.2957795
C**** DEFAULT SIZE TO BE .15 IF NEGATIVE OR ZERO                        TIGP0195
    211 IF(STT(II).LE.0.)STT(II)=.15                                    TIGP0196
        ICH=KIN(STT(II)*.873)
        ICV=ICH*1.6                                                     TIGP0198
```

```
              IF(ITT(II).EQ.1)GO TO 220                              TIGP0199
              IX=IXTOS(XTT(II))                                      TIGP0200
              IY=IYTOS(YTT(II))                                      TIGP0201
              GO TO 230                                              TIGP0202
          220 IX=XTT(II)                                             TIGP0203
              IY=YTT(II)                                             TIGP0204
          230 CALL PLCHAR(ICH,ICV)                                   TIGP0205
              IC=JTT(II)                                             TIGP0206
              IA=KTT(II)                                             TIGP0207
              CALL PTITE(IX,IY,8,ITC(1,II),IC,40,ANG,IPPX(1,II),IPPY(1,II)) TIGP0208
          240 CONTINUE                                               TIGP0209
              CALL LINROT(0.)                                        TIGP0210
          250 NYM=IYDEN
              NXM=IXDEN
              CALL SHADEIT(IPPX,IPPY,NTITE)
              IF(IGRIDX.EQ.0)GO TO 260                               TIGP0211
              CALL PGRIDX(IPPX,IPPY,NTITE,NXM,NYM,1000,IGRIDX)
          260 IF(IGRIDY.EQ.0)GO TO 270
              CALL PGRIDY(IPPX,IPPY,NTITE,NXM,NYM,1000,IGRIDY)
       C                                                             TIGP0217
       C     MERGE HERE FOR INTERACTIVE FUNCTIONS (EELL)             TIGP0218
       C                                                             TIGP0219
          270 CONTINUE                                               TIGP0220
          280 CALL SWCHAR(0)
              CALL CHRSIZ(4)                                         TIGP0221
              IKILL=0                                                TIGP0222
              IF(LCNT.LT.220) GO TO 710                              TIGP0223
              IF(NPTOT.EQ.1) GO TO 320                               TIGP0224
              CALL GETVAL(ICHAR,XO,YO)                               TIGP0225
          290 IF(ICHAR.LE.64.OR.ICHAR.GE.95)GO TO 300                TIGP0226
              ICHAR=ICHAR-64                                         TIGP0227
              ICHECK=IQUICK(ICHAR)                                   TIGP0228
              IF(ICHECK.EQ.0) GO TO 300                              TIGP0229
              GO TO (390,500,540,280,590,640,720,740,770,570,800,790),ICHECK TIGP0230
          300 LCNT=LCNT-LDEL                                         TIGP0231
              CALL NOTATE(0,LCNT,10,MSG4)                            TIGP0232
              GO TO 280                                              TIGP0233
       C                                                             TIGP0234
       C     ADD POINT AFTER OR BEFORE SPECIFIED POINT (A OR B)      TIGP0235
       C                                                             TIGP0236
       C     CHECK IF C COMMAND  AND FIRST POINT.                    TIGP0237
       C                                                             TIGP0238
          310 IF(NPTOT.EQ.0)GO TO 590                                TIGP0239
          320 LCNT=LCNT-LDEL                                         TIGP0240
              CALL NOTATE(0,LCNT,20,MSG1)                            TIGP0241
          330 CALL GETVAL(ICHAR,XO,YO)                               TIGP0242
       C         CHECK FOR NEW LINE COMMAND                          TIGP0243
              IF(ICHAR.EQ.86) GO TO 760                              TIGP0244
       C         CHECK FOR ADD AFTER                                 TIGP0245
          340 IF(ICHAR.EQ.65) GO TO 350                              TIGP0246
       C         CHECK FOR MOVE                                      TIGP0247
              IF(ICHAR.EQ.77) GO TO 350                              TIGP0248
       C         IF NOT A B OR M GO TO NEW COMMAND                   TIGP0249
              IF(ICHAR.NE.66) GO TO 290                              TIGP0250
          350 CALL POINTA(XO,YO)                                     TIGP0251
              CALL MOVEA(XO,YO)                                      TIGP0252
              IF(IOFF.EQ.0)CALL ANCHO(IS)                            TIGP0253
              IF(ICHAR.EQ.77) GO TO 370                              TIGP0254
       C*** CHECK FOR STORAGE EXCEEDING 280 WARNING LIMIT            TIGP0255
       C         INCREMENT STORAGE COUNTER                           TIGP0256
       C     NPTOT=NPTOT+1                                           TIGP0257
       C         INCREMENT STORAGE COUNTER                           TIGP0258
```

```
C     NSTOR=NSTOR+1                                                    TIGP0259
C*** NEW LIST LINKED DATA SRORAGE
C*** NSTOR = LAST USED CELL
C*** NPTOT = NUMBER OF ACTUAL POINTS
      ISTOR=ISUB(KLAST)
      ISUB(KLAST)=ISUB(ISTOR)
      IF(JSAVE.EQ.KLAST)KLAST=ISTOR
      NSTOR=NSTOR+1
      NPTOT=NPTOT+1
      NPTA(ISAVE)=NPTA(ISAVE)+1                                        TIGP0260
C         MOVE POINTER OF CLOSEST POINT TO END                         TIGP0261
      ISUB(ISTOR)=ISUB(JSAVE)                                          TIGP0262
C        CHANGE CLOSEST POINTER TO ACCESS LAST POINT                   TIGP0263
      ISUB(JSAVE)=ISTOR                                                TIGP0264
      IF(ICHAR.EQ.65) GO TO 360                                        TIGP0265
C        MOVE OLD POINT TO LAST POINT ( INSERT BEFORE)                 TIGP0266
      X(ISTOR)=X(JSAVE)                                                TIGP0267
      Y(ISTOR)=Y(JSAVE)                                                TIGP0268
      GO TO 370                                                        TIGP0269
C        NEW POINT ADD AFTER                                           TIGP0270
  360 JSAVE=ISTOR                                                      TIGP0272
  370 X(JSAVE)=X0                                                      TIGP0273
      Y(JSAVE)=Y0                                                      TIGP0274
      IF(NSTOR.LT.995) GO TO 330                                       TIGP0275
      CALL NEWPAG                                                      TIGP0276
      CALL CHRSIZ(1)                                                   TIGP0277
      CALL ANMODE                                                      TIGP0278
      PRINT 380, NSTOR-NPTOT+5                                         TIGP0279
  380 FORMAT(* WARNING DATA STORAGE IS NEARING 1000 MAX LIMIT*/        TIGP0280
     1 * A REPACK PROCEDURE HAS BEEN INVOKED TO GIVE YOU*,I3,/         TIGP0281
     2 * MORE STORAGE LOCATIONS....PRESS RETURN TO CONTINUE*           TIGP0282
     3 ,/,* AND DELETE POINTS IF YOU CAN*)                             TIGP0283
      CALL TINPUT(I)                                                   TIGP0284
      CALL CHRSIZ(4)                                                   TIGP0285
      GO TO 500                                                        TIGP0286
C                                                                      TIGP0287
C     DELETE POINT (D)                                                 TIGP0288
C                                                                      TIGP0289
  390 DSAVE=1.E40                                                      TIGP0290
      IF(NPTOT.EQ.0) GO TO 280                                         TIGP0291
      IS=64                                                            TIGP0292
      NSUM=1                                                           TIGP0293
      K=1                                                              TIGP0294
      DO 430 I=1,NL                                                    TIGP0295
      NEND=NSUM+NPTA(I)-1                                              TIGP0296
C****                                                                  TIGP0297
C****SAVE THE POINT BEGINNING EACH LINE                                TIGP0298
      KBEGN=K                                                          TIGP0299
      DO 420 J=NSUM,NEND                                               TIGP0300
      IF(IKILL.LE.0)GO TO 395
      IF(I.NE.IKILL)GO TO 410
  395 IF(NLINE.EQ.0) GO TO 400                                         TIGP0301
      IF(NDRAW(I).EQ.0) GO TO 410                                      TIGP0302
  400 XDX=X(K)-X0                                                      TIGP0303
      YDY=Y(K)-Y0                                                      TIGP0304
      DIST=XDX*XDX*RDX2+YDY*YDY*RDY2                                   TIGP0305
      IF(DIST.GE.DSAVE)GO TO 410                                       TIGP0306
      DSAVE=DIST                                                       TIGP0307
      JSAVE=K                                                          TIGP0308
      ISAVE=I                                                          TIGP0309
      KLINE=KBEGN                                                      TIGP0310
  410 KBEFL=KLAST
```

```
      KLAST=K
  420 K=ISUB(K)
  430 NSUM=NEND+1
      IS=ISAVE+64
  440 IF(IS.LE.90)GO TO 450
      IS=IS-90
      GO TO 440
  450 CALL POINTA(X(JSAVE),Y(JSAVE))
      IF(ICFF.EQ.0)CALL ANCHO(IS)
      IF(ICHAR.EQ.11)GO TO 810
      IF(ICHAR.NE.4) GO TO 310
      K=JSAVE
C**** NEW REVISION SPRING 82
      IF(K.NE.KLAST) GO TO 460
      KLAST=KBEFL
      GO TO 470
  460 KFWD=ISUB(K)
      IF(KFWD.NE.KLAST)GO TO 462
      KLAST=K
      GO TO 465
  462 ISUB(K)=ISUB(KFWD)
      ISUB(KFWD)=ISUB(KLAST)
      ISUB(KLAST)=KFWD
  465 X(K)=X(KFWD)
      Y(K)=Y(KFWD)
  470 NPTOT=NPTOT-1
      NSTOR=NSTOR-1
      NPTA(ISAVE)=NPTA(ISAVE)-1
      IF(NPTA(ISAVE).GT.0)GO TO 490
      NPTA(ISAVE)=0
      J=0
      DO 480 I=1,NL
      IF(I.EQ.ISAVE)GO TO 480
      J=J+1
      NPTA(J)=NPTA(I)
      VLAEL(J)=VLABL(I)
      MTT(J)=MTT(I)
      LTT(J)=LTT(I)
  480 CONTINUE
      NPTA(NL)=0
      NL=NL-1
      IKILL=0
  490 IF(IKILL.EQ.0)GO TO 280
      IKILL=ISAVE
      GO TO 810
C
C     END (E)
C
  500 CALL NEWPAG
      L=1
      DO 530 I=2,NPTOT
      K=ISUB(L)
      IF(I.EQ.K) GO TO 530
      J=K
      JLEFT=NPTOT+1-I
      DO 510 KK=1,JLEFT
      IF(J.EQ.I) GO TO 520
      JO=J
  510 J=ISUB(JO)
  520 ISUB(JO)=K
      ISUB(L)=I
      IS=ISUB(I)
```

```
      ISUB(I)=ISUB(K)                                          TIGP0372
      ISUB(K)=IS                                               TIGP0373
      XS=X(I)                                                  TIGP0374
      X(I)=X(K)                                                TIGP0375
      X(K)=XS                                                  TIGP0376
      XS=Y(I)                                                  TIGP0377
      Y(I)=Y(K)                                                TIGP0378
      Y(K)=XS                                                  TIGP0379
  530 L=I                                                      TIGP0380
      IF(ICHECK.EQ.2) RETURN                                   TIGP0381
      GO TO 30                                                 TIGP0382
C                                                              TIGP0383
C     FORMAT (F)                                               TIGP0384
C                                                              TIGP0385
  540 LCNT=LCNT-LDEL                                           TIGP0386
      CALL MOVABS(0,LCNT)                                      TIGP0387
      CALL ANMODE                                              TIGP0388
      IY=(YO-YEEG)/DELY+300                                    TIGP0389
      II=(3045-IY)/50+1                                        TIGP0390
      IF(II.LT.1) II=1                                         TIGP0391
      IF(II.GT.NL) II=NL                                       TIGP0392
      PRINT 550,LTT(II),MTT(II)                                TIGP0393
  550 FORMAT(* LT= *,I2,* MT= *,I2)                            TIGP0394
      CALL GETIN(2,VTEM)                                       TIGP0395
      LTT(II)=VTEM(1)
      MTT(II)=VTEM(2)                                          TIGP0396
      LCNT=LCNT-LDEL                                           TIGP0397
C                                                              TIGP0398
C     IF F OUTSIDE OF AXIS THE SET ALL CURVE MODES             TIGP0399
C                                                              TIGP0400
      IF(XO.LE.TXMIN) GO TO 280                                TIGP0401
      DO 560 I=1,50                                            TIGP0402
      LTT(I)=VTEM(1)
  560 MTT(I)=VTEM(2)                                           TIGP0403
      GO TO 280                                                TIGP0404
C                                                              TIGP0405
C     CHANGE GRID OPTION                                       TIGP0406
C                                                              TIGP0407
  570 LCNT=LCNT-LDEL                                           TIGP0408
      CALL MOVABS(0,LCNT)                                      TIGP0409
      CALL ANMODE                                              TIGP0410
      PRINT *,
     1"GRID OPTIONS,(IN X,Y PAIRS)MAJOR,MINOR TICK MARKS , GRID SWTCHS"
      CALL GETIN(6,VTEM)                                       TIGP0413
      LCNT=LCNT-LDEL
      IXDEN=VTEM(1)                                            TIGP0414
      IYDEN=VTEM(2)                                            TIGP0415
      ITMX=VTEM(3)
      ITMY=VTEM(4)
      IGRIDY=VTEM(5)                                           TIGP0416
      IGRIDX=VTEM(6)                                           TIGP0417
      GO TO 280                                                TIGP0420
C                                                              TIGP0421
C     NEW LINE (N)                                             TIGP0422
C                                                              TIGP0423
  590 NPTOT=NPTOT+1                                            TIGP0424
      NSTOR=NSTOR+1                                            TIGP0425
      IF(NPTOT.NE.1) GO TO 591                                 TIGP0426
      ISTOR=1
      GO TO 592
  591 ISTOR=ISUB(KLAST)
  592 KLAST=ISTOR
```

```
         IF(IPLOT+ITAB.EC.0)GO TO 760                                  TIGP0428
     600 X(ISTOR)=X0                                                   TIGP0429
         Y(ISTOR)=Y0                                                   TIGP0430
         NL=NL+1                                                       TIGP0431
         IS=NL+64                                                      TIGP0432
         ISAVE=NL
         JSAVE=ISTOR
C                                                                      TIGP0433
C        NO DATA THEN DO[T SYMBOL IT                                   TIGP0434
C                                                                      TIGP0435
         IF(IPLOT.EC.0) GO TO 630                                      TIGP0436
     610 IF(IS.LE.90)GO TO 620                                         TIGP0437
         IS=IS-90                                                      TIGP0438
         GO TO 610                                                     TIGP0439
     620 CALL POINTA(X0,Y0)                                            TIGP0440
         IF(IOFF.EC.0)CALL ANCHO(IS)                                   TIGP0441
     630 NPTA(NL)=1                                                    TIGP0442
         NL1=NL+1                                                      TIGP0443
         NPTA(NL1)=0                                                   TIGP0444
         LCNT=LCNT-LDEL                                                TIGP0445
         CALL NOTATE(0,LCNT,22,MSG2)                                   TIGP0446
         LCNT=LCNT-LDEL                                                TIGP0447
         CALL MOVABS(0,LCNT)                                           TIGP0448
         CALL ANMODE                                                   TIGP0449
         CALL GETIN(3,VTEM)
         VLABL(NL)=VTEM(1)
         LTT(NL)=VTEM(2)
         MTT(NL)=VTEM(3)
C*****ISAVE=NL                                                         TIGP0451
C*****JSAVE=NSTOR                                                      TIGP0452
         IF(IPLOT.EC.0) GO TO 710                                      TIGP0453
         GO TO 320                                                     TIGP0454
C                                                                      TIGP0455
C        PLOT (P)                                                      TIGP0456
C                                                                      TIGP0457
C                                                                      TIGP0458
C        CHECK FOR TABLET MODE, SKIP SPECIAL P SECTION IF TABLET       TIGP0459
C                                                                      TIGP0460
     640 IF(ITAB.EC.1) GO TO 710                                       TIGP0461
         IF(X0.GT.TXMIN) GO TO 710                                     TIGP0462
         IF(IDEN.GT.0)GO TO 680                                        TIGP0463
         LCNT=3120
         CALL MOVABS(0,LCNT)
         CALL ANMODE                                                   TIGP0465
         PRINT 650,(LAEVAL(J1),J1=1,NCC)                               TIGP0466
         CALL MOVABS(2800,2800)                                        TIGP0467
     650 FORMAT(8A10)                                                  TIGP0468
         LCNT=LCNT-LDEL                                                TIGP0469
         KL=0                                                          TIGP0470
         DO 670 J1=1,NL                                                TIGP0471
         LCNT=LCNT-LDEL                                                TIGP0472
         CALL MOVABS(0,LCNT)                                           TIGP0473
         IF(KL.EC.27)KL=0                                              TIGP0474
         KL=KL+1                                                       TIGP0475
         CALL ANMODE                                                   TIGP0476
         PRINT 660,KL,VLABL(J1)                                        TIGP0477
     660 FORMAT(1X, R1,G13.5)                                          TIGP0478
     670 CONTINUE                                                      TIGP0479
         IDEN=1                                                        TIGP0480
C**** GET BACK TO PLOTTING LABEL ONLY TURNED ON
         GO TO 280
C****
```

```
      680 IF(NLINE.GT.0) GO TO 700                              TIGP0481
          DO 690 I=1,NL                                         TIGP0482
      690 NDRAW(I)=0                                            TIGP0483
      700 IY=(YO-YBEG)/DELY+300                                 TIGP0484
          II=(3045-IY)/50+1                                     TIGP0485
          IF(II.LT.1) II=1                                      TIGP0486
          IF(II.GT.NL) II=NL                                    TIGP0487
          NDRAW(II)=1                                           TIGP0488
          NLINE=1                                               TIGP0489
          GO TO 280                                             TIGP0490
      710 CALL NEWPAG                                           TIGP0491
          GO TO 50                                              TIGP0492
C                                                               TIGP0493
C         RESTORE WINDOW (R)                                    TIGP0494
C                                                               TIGP0495
      720 IF(XO.GT.TXMIN.OR.NLINE.EQ.0) GO TO 730               TIGP0496
          NLINE=0                                               TIGP0497
          GO TO 280                                             TIGP0498
      730 IWIN=0                                                TIGP0499
          GO TO 710                                             TIGP0500
C                                                               TIGP0501
C         SHOW VALUE (S)                                        TIGP0502
C                                                               TIGP0503
      740 LCNT=LCNT-LDEL                                        TIGP0504
          CALL MOVABS(0,LCNT)                                   TIGP0505
          CALL ANMODE                                           TIGP0506
          PRINT 750,XO,YO                                       TIGP0507
      750 FORMAT(*X=*,G13.5,/,*Y=*,G13.5)                       TIGP0508
          LCNT=LCNT-LDEL                                        TIGP0509
          GO TO 280                                             TIGP0510
C                                                               TIGP0511
C         VALUE IN (V)                                          TIGP0512
C                                                               TIGP0513
      760 LCNT=LCNT-LDEL                                        TIGP0514
          CALL NOTATE(0,LCNT,10,MSG5)                           TIGP0515
          LCNT=LCNT-LDEL                                        TIGP0516
          CALL MOVABS(0,LCNT)                                   TIGP0517
          CALL ANMODE                                           TIGP0518
          CALL GETIN(2,VTEM)                                    TIGP0519
          XO=VTEM(1)                                            TIGP0520
          YO=VTEM(2)                                            TIGP0521
C                                                               TIGP0522
C         CHECK FOR N COMMAND VALUE INPUT SECTION.              TIGP0523
C                                                               TIGP0524
          IF(IPLOT.EQ.0) GO TO 600                              TIGP0525
          LCNT=LCNT-LDEL                                        TIGP0526
          CALL NOTATE(0,LCNT,13,MSG6)                           TIGP0527
          CALL TINPUT(ICHAR)                                    TIGP0528
          GO TO 340                                             TIGP0529
C                                                               TIGP0530
C         WINDOW (W)                                            TIGP0531
C                                                               TIGP0532
      770 CALL GETVAL(ICHAT,X1,Y1)                              TIGP0533
      780 AXMIN=AMIN1(XO,X1)                                    TIGP0534
          AXMAX=AMAX1(XO,X1)                                    TIGP0535
          AYMIN=AMIN1(YO,Y1)                                    TIGP0536
          AYMAX=AMAX1(YO,Y1)                                    TIGP0537
          IWIN=1                                                TIGP0538
          IF(ICHAT.EQ.122) GO TO 710                            TIGP0539
          IF((AYMAX-AYMIN)/DELY.GT.8.) GO TO 710                TIGP0540
          LCNT=LCNT-LDEL                                        TIGP0541
          CALL NOTATE(0,LCNT,29,MSG7)                           TIGP0542
```

```
              LCNT=LCNT-LDEL*2                                    TIGP0543
              CALL MOVABS(O,LCNT)                                 TIGP0544
              CALL ANMODE                                         TIGP0545
              LCNT=LCNT-1                                         TIGP0546
              CALL GETIN(4,VTEM)                                  TIGP0547
              XO=VTEM(1)                                          TIGP0548
              YO=VTEM(2)                                          TIGP0549
              X1=VTEM(3)                                          TIGP0550
              Y1=VTEM(4)                                          TIGP0551
              DELY=1.E-99                                         TIGP0552
              GO TO 780                                           TIGP0553
       C***** LOCATE TITLE                                        TIGP0554
       C*****                                                     TIGP0555
       C*790 CALL SWCHAR(1)                                       TIGP0556
          790 CALL INTITE(XO,YO)                                  TIGP0557
       ****   CALL SWCHAR(O)                                      TIGP0558
              GO TO 280                                           TIGP0559
       C***** DELETE ENTIRE LINE CODE                             TIGP0560
       C*****                                                     TIGP0561
          800 IKILL=-1                                            TIGP0562
              GO TO 390                                           TIGP0563
          810 XO=X(KLINE)                                         TIGP0564
              YO=Y(KLINE)                                         TIGP0565
              ICHAR=4                                             TIGP0566
              GO TO 390                                           TIGP0567
              END                                                 TIGP0568
       CDWIDE
              SUBROUTINE DWIDE(X,Y,IR)
              COMMON/TEKGPPR/LDEL,LCNT,MAXSR,LTV(17),EN(2),DELX,DELY
              DATA DS/8./
              IF(IR.EQ.-1)GO TO 200
              DX=(X-XB)/DELX
              DY=(Y-YB)/DELY
              ANG=1.570796E3
              SL=1.E10
              IF(DX.EQ.0.) GO TO 120
              SL=DY/DX
              ANG=ATAN(SL)
          120 DXP=DS*SIN(ANG)
              DYP=DS*COS(ANG)
              IF(SL.NE.0.) DXP=-DXP
              IF((DX*DYP-DY*DXP).GE.0.)GO TO 190
              DXP=-DXP
              DYP=-DYP
          190 DXP=DXP*DELX
              DYP=DYP*DELY
              CALL DRAWA(XB+DXP,YB+DYP)
              CALL DRAWA(X+DXP,Y+DYP)
              CALL DRAWA(X,Y)
          200 XB=X
              YB=Y
              IR=0
              RETURN
              END
       CGETVAL                                                    GETV0001
              SUBROUTINE GETVAL(ICHAR,XV,YV)                      GETV0002
              COMMON/TEKGPPR/DUM(3),ICL,ITAB,ITAES,XS,YS,DUM2(20),NLINE  GETV0003
       C      ICL=0   INITIALIZE TABLET                           GETV0004
       C      IC=0    NOT IN CONTINUOUS MODE                      GETV0005
       C      ITAB=0  SCREEN CURSER                               GETV0006
       C****                                                      GETV0007
```

```
C****  GET VALUE AND CHARACTER FROM CROSS HAIRS OR TABLET              GETV0008
C****                                                                   GETV0009
C****                                                                   GETV0010
C****  CHECK FOR TABLE INPUTS                                           GETV0011
C****                                                                   GETV0012
    10 IF(ITAB.EQ.1)GO TO 20                                            GETV0013
       CALL VCURSR(ICHAR,XV,YV)                                         GETV0014
C****                                                                   GETV0015
C****  CHECK TO SEE IF SCREEN COMMAND WAS TO ACTIVATE TABLET            GETV0016
C****                                                                   GETV0017
       IF(ICHAR.NE.84)GO TO 30                                          GETV0018
       ITAB=1                                                           GETV0019
       ICL=ITABS                                                        GETV0020
C****                                                                   GETV0021
C****  SET TABLET LAST CHARACTER (ALSO USED AS A FLAG FOR INITIALIZATION GETV0022
C****                                                                   GETV0023
    20 ICHAR=ICL                                                        GETV0024
       CALL TABVU(ICHAR,XV,YV)                                          GETV0025
C****                                                                   GETV0026
C****  SAVE LAST TABLET CHARACTER COMMAND                               GETV0027
C****                                                                   GETV0028
       ICL=ICHAR                                                        GETV0029
C***   IF IN TABLET MODE AND A NEW LINE COMMAND
C***   THEN TURN OFF COMMAND ...DEFAULT IT TO ADD AFTER
       IF(ICL.EQ.78)ICL=65
       NLINE=0                                                          GETV0030
C
C      SET FLAG TO PLOT ALL LINES IN TABLET MODE
C
C****                                                                   GETV0031
C****  CHECK FOR TABLET HALT COMMAND                                    GETV0032
C****                                                                   GETV0033
       IF(ICL.NE.72)GO TO 30                                            GETV0034
C****                                                                   GETV0035
C****  TURN OFF TABLET AND SAVE LAST COMMAND                            GETV0036
C****                                                                   GETV0037
       ITAB=0                                                           GETV0038
       ITABS=ICL                                                        GETV0039
       RETURN                                                           GETV0040
    30 IF(ICHAR.EQ.69)ITABS=0                                           GETV0041
       RETURN                                                           GETV0042
       END                                                              GETV0043
CTABVU
                                                                        TABV0001
       SUBROUTINE TABVU(ICHAR,XV,YV)                                    TABV0002
       COMMON/TEKGPPR/LDEL,LCNT,MAXSR,LTV(5)                            TABV0003
      1 ,LS,MX1,MY1,MX2,MY2,XB,YB,FACX,FACY,ANG,MXB,MYB                 TABV0004
       DIMENSION MSG1(54),MSG2(43),MSG3(43),MSG4(18),ICONV(2,10),       TABV0005
      1         IRETN(2,10),XTEM(2)                                     TABV0006
       DATA ((ICONV(I,J),J=1,10),I=1,2)/65,66,67,68,69,71,72,           TABV0007
      1                               105,78,80,82,83,86,87,            TABV0008
      1                                32 ,32 ,32,32,32,32/             TABV0009
       DATA ((IRETN(I,J),J=1,10),I=1,2)/ 0, 0, 0, 0, 1, 1, 1,            TABV0010
      1                                  1, 0, 1, 1, 0, 1, 0,            TABV0011
      1                                  1, 1, 1, 1, 1, 1/              TABV0012
       DATA MSG1/ 83,113,117, 97,114,101, 32,109,101,110,               TABV0013
      1          117, 32,119,105,116,104, 32,116, 97, 98,               TABV0014
      1          108,101,116, 32, 97,110,100, 32,116,111,               TABV0015
      1          117, 99,104, 32,117,112,112,101,114, 32,               TABV0016
      1          108,101,102,116, 32,109,101,110,117, 32,               TABV0017
      1          100,111,116, 46/                                       TABV0018
       DATA MSG2/ 84,111,117, 99,104, 32, 97,120,105,115,               TABV0019
```

```
     1         32,111,114,105,103,105,110, 32, 97,110,           TABV0020
     1        100, 32,101,110,116,101,114, 32,118, 97,           TABV0021
     1        108,117,101,115, 32, 68, 32, 97,110,100,           TABV0022
     1         32, 89, 46/                                       TABV0023
      DATA MSG3/ 84,111,117, 99,104, 32, 32, 32, 97,120,         TABV0024
     1        105,115, 32, 97,116, 32,109, 97,120, 32,           TABV0025
     1        108,101,110,103,116,104, 32, 97,110,100,           TABV0026
     1         32,101,110,116,101,114, 32,118, 97,108,           TABV0027
     1        117,101, 46/                                       TABV0028
      DATA MSG4/ 76, 97,115,116, 32, 99,111,109,109, 97,         TABV0029
     1        110,100, 32,119, 97,115, 32, 32/                   TABV0030
      IF(ICHAR.NE.0)GO TO 30                                     TABV0031
C        TABLET HAS NOT BEEN SET CHECK IT                        TABV0032
      LS=100                                                     TABV0033
      CALL TABINT(1,0,0)                                         TABV0034
      CALL NEWPAG                                                TABV0035
      LCNT=3120-LDEL                                             TABV0036
C        GET MENU POSITION                                       TABV0037
      CALL NOTATE(0,LCNT,54,MSG1)                                TABV0038
      CALL BELL                                                  TABV0039
      CALL ONEPNT(MX1,MY1)                                       TABV0040
      MX2=MX1+1000                                               TABV0041
      MY2=MY1-200                                                TABV0042
      GO TO 20                                                   TABV0043
   10 LCNT=3120                                                  TABV0044
      CALL NEWPAG                                                TABV0045
   20 LCNT=LCNT-LDEL                                             TABV0046
C        GET COORDINATE INTERSECTION                             TABV0047
      CALL NOTATE(0,LCNT,43,MSG2)                                TABV0048
      CALL BELL                                                  TABV0049
      CALL ONEPNT(MXB,MYB)                                       TABV0050
      LCNT=LCNT-LDEL                                             TABV0051
      CALL MOVABS(0,LCNT)                                        TABV0052
      CALL ANMODE                                                TABV0053
      CALL GETIN(2,XTEM)                                         TABV0054
      XB=XTEM(1)                                                 TABV0055
      YB=XTEM(2)                                                 TABV0056
      LCNT=LCNT-LDEL                                             TABV0057
      MSG3(7)=88                                                 TABV0058
C      GET X AXIS POSITION MAX                                   TABV0059
      CALL NOTATE(0,LCNT,43,MSG3)                                TABV0060
      CALL BELL                                                  TABV0061
      CALL ONEPNT(MXM,NXM)                                       TABV0062
      LCNT=LCNT-LDEL                                             TABV0063
      CALL MOVABS(0,LCNT)                                        TABV0064
      CALL ANMODE                                                TABV0065
C        GET VALUE AT POSITION                                   TABV0066
      CALL GETIN(1,XM)                                           TABV0067
      DX=MXM-MXB                                                 TABV0068
      DY=NXM-MYB                                                 TABV0069
C        COMPUTE ANGLE CORRECTION                                TABV0070
      ANG=ATAN2(DY,DX)                                           TABV0071
      LCNT=LCNT-LDEL                                             TABV0072
      MSG3(7)=89                                                 TABV0073
C      GET Y AXIS POSITION MAX                                   TABV0074
      CALL NOTATE(0,LCNT,43,MSG3)                                TABV0075
      CALL BELL                                                  TABV0076
      CALL ONEPNT(MYM,NYM)                                       TABV0077
      LCNT=LCNT-LDEL                                             TABV0078
      CALL MOVABS(0,LCNT)                                        TABV0079
      CALL ANMODE                                                TABV0080
C        GET VALUE AT POSITION                                   TABV0081
```

```
      CALL GETIN(1,YM)                                              TABV0082
      DY=NYM-MYB                                                    TABV0083
      COSA=COS(ANG)                                                 TABV0084
C        SET UP COMMON FACTORS FOR ANGLE CORRECTIONS                TABV0085
      FACX=(XM-XB)*COSA/DX                                          TABV0086
      FACY=(YM-YE)*COSA/DY                                          TABV0087
      INIT=1                                                        TABV0088
      XV=XM                                                         TABV0089
      YV=YM                                                         TABV0090
      ICHAR=87                                                      TABV0091
C        RETURN PLOT COMMAND                                        TABV0092
      RETURN                                                        TABV0093
C        CHECK FOR TABLET INITALIZED                                TABV0094
   30 IF(INIT.NE.1)GO TO 40                                         TABV0095
      ICHAR=122                                                     TABV0096
      XV=XB                                                         TABV0097
      YV=YB                                                         TABV0098
      INIT=0                                                        TABV0099
      RETURN                                                        TABV0100
   40 CALL BELL                                                     TABV0101
      CALL ONEPNT(IX,IY)                                            TABV0102
C        CHECK TO SEE IF POINT SENT IS A MENU COMMAND               TABV0103
      IF(IX.GT.MX2.OR.IX.LT.MX1)GO TO 50                            TABV0104
      IF(IY.GT.MY1.OR.IY.LT.MY2)GO TO 50                            TABV0105
      IC=(IX-MX1)/LS+1                                              TABV0106
      IR=(MY1-IY)/LS+1                                              TABV0107
C        CONVERT ROW AND COLUMN POSITION TO COMMAND CHARACTER       TABV0108
      ICHAR=ICONV(IR,IC)                                            TABV0109
      IF(ICHAR.EQ.32) RETURN                                        TABV0110
      MSG4(18)=ICHAR                                                TABV0111
      LCNT=LCNT-LDEL                                                TABV0112
C        LAST MESSAGE COMMAND                                       TABV0113
      CALL NOTATE(0,LCNT,18,MSG4)                                   TABV0114
      IF(ICHAR.EQ.105)GO TO 10                                      TABV0115
      IF(IRETN(IR,IC).EQ.1)RETURN                                   TABV0116
      GO TO 40                                                      TABV0117
C        CONVERT TABLET UNITS TO VIRTUAL UNITS WITH ANGLE CORRECTION TABV0118
   50 DX=IX-MXB                                                     TABV0119
      DY=IY-MYB                                                     TABV0120
      IF(DX.EQ.0.)DX=1.E-20                                         TABV0121
      R=SQRT(DX*DX+DY*DY)                                           TABV0122
      ANGR=ATAN2(DY,DX)-ANG                                         TABV0123
      XV=R*FACX*COS(ANGR)+XB                                        TABV0124
      YV=R*FACY*SIN(ANGR)+YB                                        TABV0125
      RETURN                                                        TABV0126
      END                                                           TABV0127
CDRAWIT                                                             DRAW0001
      SUBROUTINE DRAWIT(NL,NPTA,X,Y,ISUB,MTT,LTT)
      COMMON /SHAD/KSHADE(2,168)
      COMMON/TKTRNX/ITEKC(60)                                       DRAW0003
      COMMON/TEKGPPR/DUM(20),EN(2),DEL(2),BEG(2),RDX2,RDY2,NLINE,   DRAW0004
     1 NDRAW(50)
      EQUIVALENCE (IOFF,ITEKC(30))                                  DRAW0007
      DIMENSION QSY(626),QSX(626),NPTA(1),X(1),Y(1),ISUB(1)         DRAW0006
      DIMENSION MCON(16),IDLN(10),MTT(1),LTT(1)
      DATA MCON/2,1,2,3,4,5,0,0,0,0,0,-1,-2,-3,-4,-5/
      DATA IDLN/
     +0,56,
     +776,
     +77616,
     +77777777616,
     +77761616161,
```

```
     +7777777776,
     +777777616161,
     +776655443322,
     +18/
C
C
C 0 SYMBOLS   1 LINE   2 SPLINE WRT X   3 SPLINE WRT Y   4 ARC FIT 5 CLOSED
C
      DO 1 I=1,168
      KSHADE(2,I)=0
    1 KSHADE(1,I)=0
      IT=64
      K=1
      NSUM=1
      NC=0
      DO 290 I=1,NL
      IR=-1
      KIND=LTT(I)+1
      LDASH=IDLN(KIND)
      KIND=MTT(I)+1
      IWID=0
    2 IF(KIND.LT.20)GO TO 5
      IWID=IWID+1
      KIND=KIND-10
      GO TO 2
    5 ISYM=MCON(KIND)
      ITYP=IABS(ISYM)
      IF(ITYP.GT.1) GO TO 40
      NEND=NSUM+NPTA(I)-1
      IT=IT+1
      IF(IT.GT.90)IT=65
      DO 20 J=NSUM,NEND
      IF(NLINE.EQ.0) GO TO 10
      IF(NDRAW(I).EQ.0) GO TO 20
   10 XP=X(K)
      YP=Y(K)
      IF(J.EQ.NSUM) CALL MOVEA(XP,YP)
      IF(LDASH.EQ.0)GO TO 16
      CALL DASHA(XP,YP,LDASH)
      GO TO 15
   16 IF(IWID.NE.2)GO TO 17
      CALL SHADE(XP,YP,IR)
      GO TO 15
   17 CALL DRAWA(XP,YP)
      IF(IWID.EQ.1)CALL DWIDE(XP,YP,IR)
   15 IF(ISYM.LT.0) GO TO 20
      CALL MOVEA(XP,YP)
      IF(IOFF.EQ.0) CALL ANCHO(IT)
      CALL MOVEA(XP,YP)
   20 K=ISUB(K)
   30 NSUM=NEND+1
      GO TO 290
C
C     PLOT WITH SPLINE
C
   40 NS=NC
      NPT=NPTA(I)
      NC=NC+NPT
      IT=IT+1
      IF(IT.GT.90)IT=65
      IF(NLINE.EQ.0) GO TO 60
      IF(NDRAW(I).NE.0) GO TO 60
```

```
C       LOCATE POINTER OT NEXT LINE                          DRAW0049
        DO 50 L=1,NPT                                         DRAW0050
 50     K=ISUB(K)                                             DRAW0051
        GO TO 290                                             DRAW0052
 60     JFIT=2                                                DRAW0053
        YO=Y(K)                                               DRAW0054
        K1=ISUB(K)                                            DRAW0055
        IF(ITYP.GT.2) GO TO 80                                DRAW0056
        XO=X(K)                                               DRAW0057
C       CHECK X DATA FOR ASCENDING ORDER                      DRAW0058
        DO 70 L=2,NPT                                         DRAW0059
        X1=X(K1)                                              DRAW0060
        IF(X1.LE.XO) GO TO 110                                DRAW0061
        K1=ISUB(K1)                                           DRAW0062
 70     XO=X1                                                 DRAW0063
        GO TO 210                                             DRAW0064
 80     IF(ITYP.GT.3) GO TO 100                               DRAW0065
C       CHECK Y DATA FOR ASCENDING ORDER                      DRAW0066
        DO 90 L=2,NPT                                         DRAW0067
        Y1=Y(K1)                                              DRAW0068
        IF(Y1.LE.YO) GO TO 110                                DRAW0069
        K1=ISUB(K1)                                           DRAW0070
 90     YO=Y1                                                 DRAW0071
        GO TO 210                                             DRAW0072
 100    JFIT=ITYP-2                                           DRAW0073
 110    NCIR=0
        IF(JFIT.EQ.3) NCIR=-NPT/2-1                           DRAW0075
        IF(NCIR.LT.-5) NCIR=-5
        MPT=NPT-2*NCIR                                        DRAW0076
        QSY(1)=MPT                                            DRAW0077
        QSX(1)=MPT                                            DRAW0078
        S=0.                                                  DRAW0079
        KA=NS                                                 DRAW0080
        KO=KA                                                 DRAW0081
        KE=KO+NPT                                             DRAW0082
        KSAVE=K                                               DRAW0083
        KA=KA+NCIR                                            DRAW0084
        DO 160 M=1,MPT                                        DRAW0085
        M1=M+1                                                DRAW0086
        KA=KA+1                                               DRAW0087
        IF(KA.GT.KO) GO TO 130                                DRAW0088
        NDO=NPT+NCIR                                          DRAW0089
        DO 120 II=1,NDO                                       DRAW0090
 120    K=ISUB(K)                                             DRAW0091
        KA=KA+NPT                                             DRAW0092
        GO TO 140                                             DRAW0093
 130    IF(KA.NE.(KE+1))GO TO 140                             DRAW0094
        JSAVE=K                                               DRAW0095
        K=KSAVE                                               DRAW0096
        KA=KA-NPT                                             DRAW0097
 140    CONTINUE                                              DRAW0098
        L=M1+NPT                                              DRAW0099
        YYYP=Y(K)                                             DRAW0100
        XXXP=X(K)                                             DRAW0101
        K=ISUB(K)                                             DRAW0102
        IF(K.EQ.1) GO TO 150                                  DRAW0103
        DS=SQRT(RDX2*(XXXP-XO)**2+RDY2*(YYYP-YO)**2)          DRAW0104
        S=S+DS                                                DRAW0105
 150    XO=XXXP                                               DRAW0106
        YO=YYYP                                               DRAW0107
        QSX(M1)=S                                             DRAW0108
        QSY(M1)=S                                             DRAW0109
        QSX(L)=XXXP                                           DRAW0110
```

```
160 QSY(L)=YYYP                                DRAW0111
    KA=KO+NPT                                  DRAW0112
    QSX(L+1)=0.                                DRAW0113
    QSY(L+1)=0.                                DRAW0114
    QSY(L+2)=1.                                DRAW0115
    QSY(L+2)=1.                                DRAW0116
    XO=QSX(NPT+2-NCIR)                         DRAW0117
    YO=QSY(NPT+2-NCIR)                         DRAW0118
    IF(ISYM.LE.0) GO TO 169
    CALL MOVEA(XO,YO)                          DRAW0119
    IF(IOFF.EQ.0) CALL ANCHO(IT)               DRAW0120
169 CALL MOVEA(XO,YO)                          DRAW0121
    IF(IWID.EQ.1)CALL DWIDE(XO,YO,IR)
    IF(IWID.EQ.2)CALL SHADE(XO,YO,IR)
    SCK=QSX(3-NCIR)                            DRAW0122
    S=QSX(2-NCIR)                              DRAW0123
    IF(NPT.LE.1) GO TO 290                     DRAW0124
    DC=40.                                     DRAW0125
    DS=40.                                     DRAW0126
    NCK=2                                      DRAW0127
170 S=S+DS                                     DRAW0128
    XP=SPLNQ1(1,QSX,S)                         DRAW0129
    YP=SPLNQ1(1,QSY,S)                         DRAW0130
    DCK=SQRT(RDX2*(XO-XP)**2+RDY2*(YO-YP)**2)  DRAW0131
    DS= DC*DS/DCK                              DRAW0132
180 IF(S.LT.SCK) GO TO 200                     DRAW0133
    NSYM=MPT+1+NCK-NCIR                        DRAW0134
    XS=QSX(NSYM)                               DRAW0135
    YS=QSY(NSYM)                               DRAW0136
    IF(LDASH.EQ.0)GO TO 185
    CALL DASHA(XP,YP,LDASH)
    GO TO 186
185 IF(IWID.NE.2)GO TO 187
    CALL SHADE(XS,YS,IR)
    GO TO 186
187 CALL DRAWA(XS,YS)                          DRAW0137
    IF(IWID.EQ.1)CALL DWIDE(XS,YS,IR)
186 IF(ISYM.LE.0)GO TO 190
    CALL MOVEA(XS,YS)                          DRAW0139
    IF(IOFF.EQ.0) CALL ANCHO(IT)               DRAW0140
    CALL MOVEA(XS,YS)                          DRAW0141
190 NCK=NCK+1                                  DRAW0142
    SCK=QSX(NCK+1-NCIR)                        DRAW0143
    IF(NCK.LE.NPT+JFIT-2) GO TO 180            DRAW0144
    IF(JFIT.EQ.3) K=JSAVE                      DRAW0145
    GO TO 290                                  DRAW0146
200 IF(LDASH.EQ.0)GO TO 205
    CALL DASHA(XP,YP,LDASH)
    GO TO 206
205 IF(IWID.NE.2) GO TO 207
    CALL SHADE(XP,YP,IR)
    GO TO 206
207 CALL DRAWA(XP,YP)
    IF(IWID.EQ.1)CALL DWIDE(XP,YP,IR)
206 XO=XP                                      DRAW0148
    YO=YP                                      DRAW0149
    GO TO 170                                  DRAW0150
210 QSX(1)=NPT                                 DRAW0151
    DO 240 M=1,NPT                             DRAW0152
    N=M+1                                      DRAW0153
    KA=NS+M                                    DRAW0154
    L=N+NPT                                    DRAW0155
    XP=X(K)                                    DRAW0156
```

```
      YP=Y(K)                                                  DRAW0157
      IF(ISYM.LE.0) GO TO 220
      CALL MOVEA(XP,YP)                                        DRAW0159
      IF(IOFF.EQ.0) CALL ANCHO(IT)                             DRAW0160
  220 IF(ITYP.NE.3) GO TO 230                                  DRAW0161
      QSX(N)=YP                                                DRAW0162
      QSX(L)=XP                                                DRAW0163
      GO TO 240                                                DRAW0164
  230 QSX(N)=XP                                                DRAW0165
      QSX(L)=YP                                                DRAW0166
  240 K=ISUB(K)                                                DRAW0167
      QSX(L+1)=0.                                              DRAW0168
      QSX(L+2)=1.                                              DRAW0169
      XEN=QSX(NPT+1)                                           DRAW0170
      XIN=QSX(2)                                               DRAW0171
      IFITP=ITYP-1                                             DRAW0172
      BCK=BEG(IFITP)                                           DRAW0173
      ECK=EN(IFITP)                                            DRAW0174
      DELT=DEL(IFITP)*30.                                      DRAW0175
      IF(XIN.LT.BCK) XIN=BCK                                   DRAW0176
      IF(XEN.GT.ECK) XEN=ECK                                   DRAW0177
      KILL=0                                                   DRAW0178
      DO 280 M=1,200                                           DRAW0179
      XI=XIN+DELT*(M-1)                                        DRAW0180
      IF(XI.LT.XEN) GO TO 250                                  DRAW0181
      KILL=1                                                   DRAW0182
      XI=XEN                                                   DRAW0183
  250 YI=SPLNQ1(1,QSX,XI)                                      DRAW0184
      IF(ITYP.EQ.3) GO TO 260                                  DRAW0185
      XP=XI                                                    DRAW0186
      YP=YI                                                    DRAW0187
      GO TO 270                                                DRAW0188
  260 XP=YI                                                    DRAW0189
      YP=XI                                                    DRAW0190
  270 IF(M.EQ.1) CALL MOVEA(XP,YP)                             DRAW0191
      IF(LDASH.EQ.0)GO TO 275
      CALL DASHA(XP,YP,LDASH)
      GO TO 276
  275 IF(IWID.NE.2) GO TO 277
      CALL SHADE(XP,YP,IR)
      GO TO 276
  277 CALL DRAWA(XP,YP)
      IF(IWID.EQ.1)CALL DWIDE(XP,YP,IR)
  276 IF(NPT.EQ.1) GO TO 290
      IF(KILL.EQ.1) GO TO 290                                  DRAW0194
  280 CONTINUE                                                 DRAW0195
  290 CONTINUE                                                 DRAW0196
  300 RETURN                                                   DRAW0197
      END                                                      DRAW0198
CSHADE
      SUBROUTINE SHADE(XO,YO,IR)
      COMMON/TEKGPPR/LDEL,LCNT,MAXSR,LTV(17),EN(2),DEL(2),BEG(2)
      COMMON /SHAD/KSHADE(2,168)
      IXTOS(X)=((X-BEG(1))/DEL(1)+600)                         TIGP00
      IYTOS(Y)=((Y-BEG(2))/DEL(2)+300)                         TIGP00
      X=XO
      Y=YO
      IF(IR.EQ.-1) GO TO 200
      IF(XB.LT.X) GO TO 10
      X2=XB
      Y2=YP
      XB=X
```

```
      YB=Y
      GO TO 15
   10 X2=X
      Y2=Y
   15 IX1=IXTOS(XB)
      IY1=IYTOS(YB)
      IX2=IXTOS(X2)
      IY2=IYTOS(Y2)
      IF(IX2.EQ.IX1)GO TO 200
      SL=FLOAT(IY2-IY1)/FLOAT(IX2-IX1)
      B=IY1-SL*IX1
      ISX=FLOAT(IX1-600)/20.
   20 ISX=ISX+1
      IF(ISX.LT.1)ISX=1
      IX=ISX*20+600
      IF(IX.GT.IX2) GO TO 200
      IF(ISX.GT.168)GO TO 200
      IY=(SL*IX+B)
      ISY=(IY-300)/20
      IF(ISY.LE.0)GO TO 20
      IF(ISY.GT.120)ISY=120
      DO 50 I=1,ISY
      IW=I/61 +1
      IWS=KSHADE(IW,ISX)
      IP=SHIFT(1,(60*IW-I+1))
      IF((IP.AND.IWS).EQ.0)GO TO 45
      IWS=IWS.AND.(7777777777777777777B-IP)
      GO TO 50
   45 IWS=IWS.OR.IP
   50 KSHADE(IW,ISX)=IWS
      GO TO 20
  200 IR=0
      XB=XO
      YB=YO
      RETURN
      END
CSHADEIT
      SUBROUTINE SHADEIT(ITX,ITY,NTIT)
      COMMON /SHAD/KSHADE(2,168)
      DIMENSION ITX(4,50),ITY(4,50),IPP(100),ITN(100),IDN(20)
      IPEND=2700
      DEL=20.
      IDX=20
      NMAX=168
      DO 1000 N=1,NMAX
      IF(KSHADE(1,N).NE.0)GO TO 10
      IF(KSHADE(2,N).NE.0)GO TO 10
      IF((1.AND.KSHADE(1,N)).NE.0) GO TO 10
      IF((1.AND.KSHADE(2,N)).NE.0) GO TO 10
      GO TO 1000
   10 IPX=600.+DEL*N
      K=0
      DO 101 L=1,NTIT
      J=4
      DO 100 I=1,4
      IX1=ITX(J,L)
      IX2=ITX(I,L)
      IY1=ITY(J,L)
      IY2=ITY(I,L)
      IMINX=MINO(IX1,IX2)
      IF(IPX.LE.IMINX) GO TO 100
      IMAXX=MAXO(IX1,IX2)
```

```
      IF(IPX.GT.IMAXX)GO TO 100
      IF(IY1.EQ.IY2)GO TO 50
      S=(IX2-IX1)/FLOAT(IY2-IY1)
      B=FLOAT(IX1)-S*IY1
      IY1=IFIX((FLOAT(IPX)-B)/S)
   50 LL=L
      IF(IY1.GT.IPEND)GO TO 100
      IF(K.EQ.0)GO TO 95
      DO 90 M1=1,K
      IF(IY1.GT.IPP(M1))GO TO 90
      IPS1=IPP(M1)
      IPP(M1)=IY1
      IY1=IPS1
      IPS1=ITN(M1)
      ITN(M1)=LL
      LL=IPS1
   90 CONTINUE
   95 K=K+1
      ITN(K)=LL
      IPP(K)=IY1
  100 J=I
  101 CONTINUE
      NC=0
      K=K+1
      IPP(K)=IPEND
      ITN(K)=0
      IPO=300
      ISUB=0
      DO 200 I=1,K
      L=ITN(I)
      IPY=IPP(I)
      IF(NC.EQ.0)GO TO 160
      DO 120 J=1,NC
      IF(IDN(J).EQ.L) GO TO 130
  120 CONTINUE
      NC=NC+1
      IF(NC.GT.10)STOP "ERROR IN NC SHADEIT"
      IDN(NC)=L
      GO TO 140
  130 IDN(J)=IDN(NC)
      NC=NC-1
  140 IDX=(IPY/20)*20+20-IPY
      IPO=IPY
      GO TO 200
  160 IF(IPY.LT.IPO) GO TO 200
  165 IF(IPY.LT.(IPO+IDX)) GO TO 180
      IPO=IPO+IDX
      IDX=20
      ISUB=FLOAT(IPO-300)/20.
      IW=1
      IF(ISUB.GT.60)IW=2
      IWS=KSHADE(IW,N)
      ICP=SHIFT(1,(60*IW-ISUB+1))
      IF((ICP.AND.IWS).EQ.0)GO TO 165
      CALL PNTABS(IPX,IPO)
      GO TO 165
  180 CONTINUE
      IPO=IPY
      NC=NC+1
      IDN(NC)=L
  200 CONTINUE
 1000 CONTINUE
      END
```

```
CSPLNC1
      FUNCTION SPLNQ1   (NLOC,X,XINDEP)                              SPLN0001
      COMMON/SPLCO/DX,QM
C*** LOCAL CUBIC FIT   8/9/77  M.J. CADDY                            SPLN0002
      DIMENSION X(1),QM(3)                                           SPLN0003
      EQUIVALENCE (QM(1),T3),(QM(2),Q2),(QM(3),Q3)                   SPLN0004
      XIN=XINDEP                                                     SPLN0005
      NS=NLOC                                                        SPLN0006
      NOPTS=X(NS)                                                    SPLN0007
      ID=NS+NOPTS                                                    SPLN0008
      NSP1=NS+1                                                      SPLN0009
      NSP2=NS+2                                                      SPLN0010
      IF(NOPTS.LE.1) GO TO 130                                       SPLN0011
      IF(NOPTS.GT.2) GO TO 10                                        SPLN0012
      N=ID+NOPTS                                                     SPLN0013
      T3=(X(N)-X(N-1))/(X(ID)-X(ID-1))                               SPLN0014
      M=ID                                                           SPLN0015
      NTRAP=1                                                        SPLN0016
      GO TO 280                                                      SPLN0017
   10 NS2=NOPTS*2+NSP1                                               SPLN0018
      L=X(NS2)                                                       SPLN0019
      LSC=NS2+1                                                      SPLN0020
      IQMODE=X(LSC)                                                  SPLN0021
      K=L+NS                                                         SPLN0022
      NL=NSP1                                                        SPLN0023
      NH=ID                                                          SPLN0024
      NTRAP=-1                                                       SPLN0025
C*** BINARY SEARCH FOR INTERVAL                                      SPLN0026
      IF(XIN-X(ID))30,140,20                                         SPLN0027
   20 NTRAP=0                                                        SPLN0028
      GO TO 150                                                      SPLN0029
   30 IF(XIN-X(NSP1))40,40,60                                        SPLN0030
   40 NTRAP=1                                                        SPLN0031
   50 K=NSP2                                                         SPLN0032
      GO TO 160                                                      SPLN0033
   60 IF(L)120,120,70                                                SPLN0034
   70 IF(XIN-X(K))80,100,100                                         SPLN0035
   80 NH=K                                                           SPLN0036
      K=K-1                                                          SPLN0037
   90 IF(XIN-X(K))110,100,100                                        SPLN0038
  100 NL=K                                                           SPLN0039
      GO TO 120                                                      SPLN0040
  110 NH=K                                                           SPLN0041
  120 K=(NH-NL)/2+NL                                                 SPLN0042
      IF(K-NL)90,140,90                                              SPLN0043
  130 YOUT=X(NSP2)                                                   SPLN0044
      GO TO 320                                                      SPLN0045
  140 LFAST=L-NH+NS                                                  SPLN0046
      X(NS2)=NH-NS                                                   SPLN0047
  150 K=NH                                                           SPLN0048
  160 M=K                                                            SPLN0049
      N=M+NOPTS                                                      SPLN0050
      Y3=X(N-1)                                                      SPLN0051
      X3=X(M-1)                                                      SPLN0052
C*** CHECK FOR FAST MODE AND  EXTRAPOLATION                          SPLN0053
      IF(NTRAP.GE.0) GO TO 180                                       SPLN0054
      IF(IQMODE*L.EQ.0.OR.LFAST.NE.0) GO TO 180                      SPLN0055
      DO 170 I=1,3                                                   SPLN0056
  170 QM(I)=X(LSC+I)                                                 SPLN0057
      GO TO 310                                                      SPLN0058
  180 Y4=X(N)                                                        SPLN0059
      X4=X(M)                                                        SPLN0060
```

```
      A3=X4-X3                                          SPLN0061
      S3=(Y4-Y3)/A3                                     SPLN0062
      IF(M.EQ.NSP2) GO TO 190                           SPLN0063
      X2=X(M-2)                                         SPLN0064
      Y2=X(N-2)                                         SPLN0065
      S2=(Y3-Y2)/(X3-X2)                                SPLN0066
      IF(M.EQ.ID) GO TO 200                             SPLN0067
  190 X5=X(M+1)                                         SPLN0068
      Y5=X(N+1)                                         SPLN0069
      S4=(Y5-Y4)/(X5-X4)                                SPLN0070
      IF(M.EQ.NSP2)   S2=S3+S3-S4                       SPLN0071
      GO TO 210                                         SPLN0072
  200 S4=S3+S3-S2                                       SPLN0073
  210 IF(M.LE.(NSP2+1))   GO TO 220                     SPLN0074
      S1=(Y2-X(N-3))/(X2-X(M-3))                        SPLN0075
      GO TO 230                                         SPLN0076
  220 S1=S2+S2-S3                                       SPLN0077
  230 IF(M.GE.(ID-1))   GO TO 240                       SPLN0078
      S5=(X(N+2)-Y5)/(X(M+2)-X5)                        SPLN0079
      GO TO 250                                         SPLN0080
  240 S5=S4+S4-S3                                       SPLN0081
  250 W2=ABS(S4-S3)                                     SPLN0082
      W3=ABS(S2-S1)                                     SPLN0083
      SW=W2+W3                                          SPLN0084
      IF(SW.NE.0.0)    GO TO 260                        SPLN0085
      W2=0.5                                            SPLN0086
      W3=0.5                                            SPLN0087
      SW=1.0                                            SPLN0088
  260 T3=(W2*S2+W3*S3)/SW                               SPLN0089
      W3=ABS(S5-S4)                                     SPLN0090
      W4=ABS(S3-S2)                                     SPLN0091
      SW=W3+W4                                          SPLN0092
      IF(SW.NE.0.0)    GO TO 270                        SPLN0093
      W3=0.5                                            SPLN0094
      W4=0.5                                            SPLN0095
      SW=1.0                                            SPLN0096
  270 T4=(W3*S3+W4*S4)/SW                               SPLN0097
      IF(NTRAP.LT.0) GO TO 290                          SPLN0098
      IF(NTRAP.EQ.0) T3=T4                              SPLN0099
  280 IX=M-NTRAP                                        SPLN0100
C*** FAST EXIT FOR 2 POINTS AND LINEAR EXTRAPOLATION    SPLN0101
      YOUT=X(IX+NOPTS)+(XIN-X(IX))*T3                   SPLN0102
      GO TO 320                                         SPLN0103
  290 Q2=(2.0*(S3-T3)+S3-T4)/A3                         SPLN0104
      Q3=(-S3-S3+T3+T4)/(A3*A3)                         SPLN0105
      IF(IQMODE*LFAST.EQ.0) GO TO 310                   SPLN0106
      DO 300 I=1,3                                      SPLN0107
  300 X(LSC+I)=QM(I)                                    SPLN0108
  310 DX=XIN-X3                                         SPLN0109
      YOUT=Y3+DX*(T3+DX*(Q2+DX*Q3))                     SPLN0110
  320 SPLNQ1=YOUT                                       SPLN0111
      RETURN                                            SPLN0112
      END                                               SPLN0113
CPTITE
      SUBROUTINE PTITE(IXI,IYI,NTL,LABTL,IC,NM,AT,IPX,IPY)
      DIMENSION LABTL(1),IP(136),IPX(4),IPY(4)
C     NTL =NUMBER OF 10 CHARACTER WORDS
C     NM MAX CHARACTERS PER LINE
C     AT ANGLE OF TITLE
C     IX SCREEN CENTER
C     IY SCREEN CENTER
```

```
C         IC =1 NOT CENTERED TITLE
          IF(NTL.LE.0) RETURN
          NC=10*NTL
          CO=1.
          SI=0.
C         GET CHARACTER SIZE
          CALL CSIZE(IHORZ,IVERT)
C         CONVERT LABEL TO ADE
          NR=NC
          IF(NC.GT.70)NR=70
          CALL KAM2AS(NR,LABTL,IP)
          IF(NR.EQ.NC)GO TO 5
          NR=NC-70
          CALL KAM2AS(NR,LABTL(8),IP(71))
        5 IX=IXI
          IY=IYI
          IX1=IX
          IY1=IY
          ITL1=0
          NCM=0
          NL=0
          NBLK=0
          CALL LINROT(AT)
          ANG=AT*.01745329252
          CO=COS(ANG)
          SI=SIN(ANG)
          DO 70 K=1,NC
C         CHECK FOR LEADING BLANKS
          IF(IP(K).NE.32) GO TO 10
          IF(ITL1.EQ.0) GO TO 70
          NBLK=NBLK+1
C         CHECK FOR 3 BLANKS TO TERMINATE LINE
          IF(NBLK.NE.3) GO TO 20
          ITL1=ITL1-2
          GO TO 50
       10 NBLK=0
C         CHECK FOR MAX LINE LENGTH EXCEEDED
       20 IF(ITL1.LT.NM) GO TO 30
          IF(IP(K).EQ.32) GO TO 50
       30 ITL1=ITL1+1
          IP(ITL1)=IP(K)
          IF(K.LT.NC) GO TO 70
       40 ITL1=ITL1-NBLK
C         CHECK FOR VERTICAL OR HORIZ LABEL
       50 IF(ITL1.GT.NCM)NCM=ITL1
          NL=NL+1
          IX1=IX-IHORZ*ITL1*.5*CO*(1-IC)
          IYP=IY1-IHORZ*ITL1*.5*SI*(1-IC)
          CALL NOTATE(IX1,IYP,ITL1,IP)
          IX=IX+IVERT*1.1*SI
          IY1=IY1-IVERT*1.1*CO
          ITL1=0
       70 CONTINUE
          XH=.5*IHORZ*NCM+.5*IHORZ
          YH=1.0*IVERT
          XHH=.5*IHORZ*NCM*IC
          IXI=IXI+CO*XHH
          IYI=IYI+SI*XHH
          IPX(1)=IXI-XH*CO-YH*SI
          IPY(1)=IYI-XH*SI+YH*CO
          IPX(2)=IXI+XH*CO-YH*SI
          IPY(2)=IYI+XH*SI+YH*CO
```

```
      YH=(1.1*IVERT*(NL-1)+.3*IVERT)
      IPY(4)=IYI-XH*SI-YH*CO
      IPX(4)=IXI-XH*CO+YH*SI
      IPX(3)=IXI+XH*CO+YH*SI
      IPY(3)=IYI+XH*SI-YH*CO
      END
CPGRIDX
      SUBROUTINE PGRIDX(ITX,ITY,NTIT,NXU,NYU,IDX,ISKIP)
      DIMENSION ITX(4,50),ITY(4,50),IPP(100),ITN(100),IDN(10)
      IPEND=3960
      DEL=2400./NYU
      NMAX=NYU+1
      DO 1000 N=1,NMAX,ISKIP
      IPY=300.+DEL*(NMAX-N)
      K=0
      DO 101 L=1,NTIT
      J=4
      DO 100 I=1,4
      IX1=ITX(J,L)
      IX2=ITX(I,L)
      IY1=ITY(J,L)
      IY2=ITY(I,L)
      IMINY=MINO(IY1,IY2)
      IF(IPY.LE.IMINY) GO TO 100
      IMAXY=MAXO(IY1,IY2)
      IF(IPY.GT.IMAXY)GO TO 100
      IF(IX1.EQ.IX2)GO TO 50
      S=(IY2-IY1)/FLOAT(IX2-IX1)
      B=FLOAT(IY1)-S*IX1
      IX1=IFIX((FLOAT(IPY)-B)/S)
   50 LL=L
      IF(IX1.GT.IPEND)GO TO 100
      IF(K.EQ.0)GO TO 95
      DO 90 M1=1,K
      IF(IX1.GT.IPP(M1))GO TO 90
      IPS1=IPP(M1)
      IPP(M1)=IX1
      IX1=IPS1
      IPS1=ITN(M1)
      ITN(M1)=LL
      LL=IPS1
   90 CONTINUE
   95 K=K+1
      ITN(K)=LL
      IPP(K)=IX1
  100 J=I
  101 CONTINUE
      NC=0
      K=K+1
      IPP(K)=IPEND
      ITN(K)=0
      IPO=600
      CALL MOVABS(IPO,IPY)
      DO 200 I=1,K
      L=ITN(I)
      IPX=IPP(I)
      IF(NC.EQ.0)GO TO 160
      DO 120 J=1,NC
      IF(IDN(J).EQ.L) GO TO 130
  120 CONTINUE
      NC=NC+1
      IDN(NC)=L
```

```
      GO TO 140
  130 IDN(J)=IDN(NC)
      NC=NC-1
  140 CALL MOVABS(IPX,IPY)
      IPO=IPX
      GO TO 200
  160 IF(IPX.LT.IPO) GO TO 200
  165 IF(IPX.LT.(IPO+IDX)) GO TO 180
      IPO=IPO+IDX
      CALL DRWABS(IPO,IPY)
      GO TO 165
  180 CALL DRWABS(IPX,IPY)
      IPO=IPX
      NC=NC+1
      IDN(NC)=L
  200 CONTINUE
 1000 CONTINUE
      END
CPGRIDY
      SUBROUTINE PGRIDY(ITX,ITY,NTIT,NXU,NYU,IDX,ISKIP)
      DIMENSION ITX(4,50),ITY(4,50),IPP(100),ITN(100),IDN(10)
      IPEND=2700
      DEL=3360./NXU
      NMAX=NXU+1
      DO 1000 N=1,NMAX,ISKIP
      IPX=600.+DEL*(NMAX-N)
      K=0
      DO 101 L=1,NTIT
      J=4
      DO 100 I=1,4
      IX1=ITX(J,L)
      IX2=ITX(I,L)
      IY1=ITY(J,L)
      IY2=ITY(I,L)
      IMINX=MIN0(IX1,IX2)
      IF(IPX.LE.IMINX) GO TO 100
      IMAXX=MAX0(IX1,IX2)
      IF(IPX.GT.IMAXX)GO TO 100
      IF(IY1.EQ.IY2)GO TO 50
      S=(IX2-IX1)/FLOAT(IY2-IY1)
      B=FLOAT(IX1)-S*IY1
      IY1=IFIX((FLOAT(IPX)-B)/S)
   50 LL=L
      IF(IY1.GT.IPEND)GO TO 100
      IF(K.EQ.0)GO TO 95
      DO 90 M1=1,K
      IF(IY1.GT.IPP(M1))GO TO 90
      IPS1=IPP(M1)
      IPP(M1)=IY1
      IY1=IPS1
      IPS1=ITN(M1)
      ITN(M1)=LL
      LL=IPS1
   90 CONTINUE
   95 K=K+1
      ITN(K)=LL
      IPP(K)=IY1
  100 J=I
  101 CONTINUE
      NC=0
      K=K+1
      IPP(K)=IPEND
```

```
      ITN(K)=0
      IPO=300
      CALL MOVABS(IPX,IPO)
      DO 200 I=1,K
      L=ITN(I)
      IPY=IPP(I)
      IF(NC.EQ.0)GO TO 160
      DO 120 J=1,NC
      IF(IDN(J).EQ.L) GO TO 130
  120 CONTINUE
      NC=NC+1
      IDN(NC)=L
      GO TO 140
  130 IDN(J)=IDN(NC)
      NC=NC-1
  140 CALL MOVABS(IPX,IPY)
      IPO=IPY
      GO TO 200
  160 IF(IPY.LT.IPO) GO TO 200
  165 IF(IPY.LT.(IPO+IDX)) GO TO 180
      IPO=IPO+IDX
      CALL DRWABS(IPX,IPO)
      GO TO 165
  180 CALL DRWABS(IPX,IPY)
      IPO=IPY
      NC=NC+1
      IDN(NC)=L
  200 CONTINUE
 1000 CONTINUE
      END
CINTITE
      SUBROUTINE INTITE(XO,YO)
C***** SPECIAL INTERACTIVE TITLE ROUTINE
      DIMENSION IQUICK(30),MSG1(11),MSG2(5),MSG3(5),MSG4(19),MSG5(11)
      DIMENSION MSG6(7)
      DIMENSION IPPX(4),IPPY(4),VTEM(5)
      COMMON/ITITLE/IT(50),JT(50),KT(50),LT(50),MT(50),ST(50),
     1 XT(50),YT(50),XU(50),YU(50),XV(50),YV(50),ITC(8,50),NTITE
      COMMON/TEKGPPR/LDEL,LCNT,MAXSR,LTV(17),EN(2),DEL(2),BEG(2),RDX2,
     1RDY2,NLINE,NDRAW(50)
      IXTOS(X)=((X-BEG(1))/DEL(1)+600)
      IYTOS(Y)=((Y-BEG(2))/DEL(2)+300)
      XTOSX(X)=(X-600.)*DEL(1)+BEG(1)
      YTOSY(Y)=(Y-300.)*DEL(2)+BEG(2)
      DATA IQUICK/7,0,9,4,0,0,0,2,0,0,
     1            0,1,2,6,0,8,5,0,3,0,
     2            0,2,0,0,0,0,0,0,0,0/
C**** ANGLE POINT
      DATA MSG1/65,78,71,76,69,32,80,79,73,78,84/
C**** SIZE
      DATA MSG2/83,73,90,69,32/
C**** TITLE
      DATA MSG3/84,73,84,76,69/
C**** ILLEGAL
      DATA MSG6/73,76,76,69,71,65,76/
C**** ENTER IT,ANGLE,SIZE
      DATA MSG4/69,78,84,69,82,32,73,44,74,44,75,44,65,78,71,
     1 44,83,73,90/
C**** ENTER TITLE
      DATA MSG5/69,78,84,69,82,32,84,73,84,76,69/
      LCNT=LCNT-50
      CALL PLCHAR(25,39)
```

```
      CALL ANMODE
      CALL NOTATE(0,LCNT,5,MSG3)
      IF(NTITE.EQ.0)GO TO 140
      GO TO 20
   10 CALL PLCHAR(25,39)
      CALL VCURSR(ICHAR,XO,YO)
C**** IF NO TITLES THEN ASSUME TO ADD ONE
      IF(NTITE.EQ.0)GO TO 140
      IF(ICHAR.LT.64.OR.ICHAR.GE.95) GO TO 210
      ICHAR=ICHAR-64
      ICHECK=IQUICK(ICHAR)
      IF(ICHECK.EQ.0) GO TO 210
      GO TO (20,50,70,80,220,140,110,180,300)ICHECK
C**** 7=A ANGLE
C**** 1=C POSITION
C**** 4=D DELETE TITLE
C**** 5=E EXIT FROM INTERACTIVE TITLE
C**** 2=M MOVE TITLE POSITION
C**** 6=N NEW TITLE INSERT
C**** 3=S CHANGE SIZE OF LETTERS
C****
C**** POSITION ON TITLE CLOSEST
   20 DSAVE=1.E40
      DO 40 K=1,NTITE
      XXX=XT(K)
      YYY=YT(K)
      IF(IT(K).EQ.0)GO TO 30
      XXX=XTOSX(XXX)
      YYY=YTOSY(YYY)
   30 XDX=XXX-XO
      YDY=YYY-YO
      DIST=XDX*XDX*RDX2+YDY*YDY*RDY2
      IF(DIST.GT.DSAVE)GO TO 40
      NTF=K
      XXP=XXX
      YYP=YYY
      DSAVE=DIST
   40 CONTINUE
      CALL POINTA(XXP,YYP)
      GO TO 10
C****** MOVE TITLE AND CORRECT ANGLE
   50 IF(NTF.EQ.0)GO TO 210
      IF(IT(NTF).EQ.0)GO TO 60
      XO=IXTOS(XO)
      YO=IYTOS(YO)
   60 XT(NTF)=XO
      YT(NTF)=YO
      CALL POINTA(XO,YO)
      IF(ICHAR.NE.8)GO TO 61
      XU(NTF)=XV(NTF)=0.
      YU(NTF)=YV(NTF)=0.
      GO TO 180
   61 IF(ICHAR.NE.22)GO TO 62
      XU(NTF)=XV(NTF)=YU(NTF)=0.
      YV(NTF)=1.
      GO TO 180
   62 CALL VCURSR(ICA,XO,YO)
      XU(NTF)=XO
      YU(NTF)=YO
  120 CALL POINTA(XO,YO)
      CALL VCURSR(ICH,XB,YB)
      CALL POINTA(XB,YB)
```

```
      XV(NTF)=XB
      YV(NTF)=YB
C**** PLOT NEW TITLE
      GO TO 180
C****
C**** CHANGE THE SIZE OF THE TITLE
   70 IF(NTF.EQ.0) GO TO 210
      LCNT=LCNT-50
      CALL NOTATE(0,LCNT,5,MSG2)
      CALL ANMODE
      CALL GETIN(1,ST(NTF))
      GO TO 10
C****
C**** DELETE TITLE
   80 IF(NTF.EQ.0)GO TO 20
      IF(NTF.EQ.NTITE)GO TO 100
      IT(NTF)=IT(NTITE)
      JT(NTF)=JT(NTITE)
      KT(NTF)=KT(NTITE)
      ST(NTF)=ST(NTITE)
      XT(NTF)=XT(NTITE)
      YT(NTF)=YT(NTITE)
      XU(NTF)=XU(NTITE)
      YU(NTF)=YU(NTITE)
      XV(NTF)=XV(NTITE)
      YV(NTF)=YV(NTITE)
      DO 90 I=1,8
   90 ITC(I,NTF)=ITC(I,NTITE)
  100 NTITE=NTITE-1
      NTF=0
      GO TO 10
C****
C**** ADD ARROW TO TITLE CODE
C****
  110 NTITE=NTITE+1
      NTF=NTITE
      IT(NTF)=0
      JT(NTF)=0
      KT(NTF)=1
      DO 150 I=1,8
  150 ITC(I,NTITE)=10H
      ITC(1,NTITE)=10HARROW
      GO TO 60
C**** ADD NEW TITLE
  140 LCNT=LCNT-50
      CALL NOTATE(0,LCNT,10,MSG4)
      CALL ANMODE
      CALL GETIN(2,VTEM)
      LCNT=LCNT-50
      CALL NOTATE(0,LCNT,11,MSG5)
      NTITE=NTITE+1
      NTF=NTITE
      IT(NTF)=VTEM(1)
      JT(NTF)=VTEM(2)
      KT(NTF)=0
      ST(NTF)=.15
      CALL ANMODE
      READ (5,170)(ITC(I,NTITE),I=1,8)
  170 FORMAT(8A10)
      GO TO 50
C****
C****  PRINT TITLE AND ASK AGAIN
```

```
C****
   180 IF(NTF.EQ.0)GO TO 210
       I=NTF
       IF(KT(I).EQ.1)GO TO 200
       CALL SWCHAR(1)
       IX=XT(I)
       IY=YT(I)
       IF(IT(I).EQ.1)GO TO 190
       IX=IXTOS(XT(I))
       IY=IYTOS(YT(I))
   190 IF(ST(I).LE.0.)ST(I)=.10
       ICH=KIN(ST(I)*.873)
       ICV=ICH*1.6
       IC=JT(I)
       CALL PLCHAR(ICH,ICV)
       DANGX=(XV(I)-XU(I))*SQRT(RDX2)
       DANGY=(YV(I)-YU(I))*SQRT(RDY2)
       ANG=0.
       IF(DANGY.EQ.0..AND.DANGX.EQ.0.) GO TO 195
       ANG=ATAN2(DANGY,DANGX)*57.2957795
   195 CALL PTITE(IX,IY,8,ITC(1,I),IC,70,ANG,IPPX,IPPY)
       CALL LINROT(0.)
       CALL SWCHAR(0)
       GO TO 10
   200 IA1=IXTOS(XU(I))
       IA2=IYTOS(YU(I))
       IB1=IXTOS(XV(I))
       IB2=IYTOS(YV(I))
       CALL MCVEA(XT(I),YT(I))
       CALL DARROW(IA1,IA2,IB1,IB2)
       GO TO 10
C****
C**** COPY HEADING
C****
   300 IF(NTF.EQ.0)GO TO 210
       NTO=NTF
       NTITE=NTITE+1
       NTF=NTITE
       IT(NTF)=IT(NTO)
       JT(NTF)=JT(NTO)
       KT(NTF)=KT(NTO)
       ST(NTF)=ST(NTO)
       DO 310 I=1,8
   310 ITC(I,NTF)=ITC(I,NTO)
       GO TO 50
   210 LCNT=LCNT-50
       CALL NOTATE(0,LCNT,7,MSG6)
       GO TO 10
C****
C**** END OF INTERACTIVE TEST
   220 RETURN
       END
CDARROW
       SUBROUTINE DARROW(IX1,IY1,IX2,IY2)
       CALL DRWABS(IX1,IY1)
       ANG=0.
       IF(IY2.EQ.IY1.AND.IX2.EQ.IX1)GO TO 10
       ANG=ATAN2(FLOAT(IY2-IY1),FLOAT(IX2-IX1))
    10 I2=IY2-80.*SIN(ANG-.2)
       I1=IX2-80.*COS(ANG-.2)
       I4=IY2-80.*SIN(ANG+.2)
       I3=IX2-80.*COS(ANG+.2)
```

```
      IX=.5*(I1+I3)
      IY=.5*(I2+I4)
      CALL DRWABS(IX,IY)
      CALL DRWABS(I1,I2)
      CALL DRWABS(IX2,IY2)
      CALL DRWAES(I3,I4)
      CALL DRWAES(I1,I2)
      RETURN
      END
CGETIN
```

```
                                                                GETI0001
      SUBROUTINE GETIN(NIN,Y)                                   GETI0002
C                                                               GETI0003
C         SIMULATED MISSION ENGINE TEST CODE                    GETI0004
C             MICHAEL CADDY  3/19/78                            GETI0005
      DIMENSION Y(1),IC(80)                                     GETI0006
C         FREE FORM INPUT CODE                                  GETI0007
      NW=0                                                      GETI0008
   10 J=0                                                       GETI0009
      READ 20,IC                                                GETI0010
C         CHECK FOR END OF FILE                                 GETI0011
      IF(EOF(5).EQ.0)GO TO 30                                   GETI0012
      NIN=NW                                                    GETI0013
      RETURN                                                    GETI0014
   20 FORMAT(80R1)                                              GETI0015
   30 JC=0                                                      GETI0016
      JD=0                                                      GETI0017
      JS=1                                                      GETI0018
      NC=0                                                      GETI0019
      X=0.                                                      GETI0020
   40 J=J+1                                                     GETI0021
C         ONLY ONE CARD PER INPUT READ                          GETI0022
C         MODIFIED TO READ MORE THAN ONE CARD 4/26/78 MJC
      IF(J.GT.80)  GO TO 10                                     GETI0023
      I=IC(J)                                                   GETI0024
C         CHECK FOR VALID NUMERIC FIELD                         GETI0025
      IF(I.GT.32B.AND.I.LT.45B) GO TO 110                       GETI0026
C         IGNORE LEAD + SIGN                                    GETI0027
      IF(I.EQ.45B) GO TO 40                                     GETI0028
C         SET FLAG FOR NEGATIVE VALUE                           GETI0029
      IF(I.NE.46B) GO TO 50                                     GETI0030
      JS=-1                                                     GETI0031
      GO TO 40                                                  GETI0032
C         CHECK FOR DECIMAL                                     GETI0033
   50 IF(I.NE.57B) GO TO 60                                     GETI0034
      IF(JC.EQ.-1) GO TO 120                                    GETI0035
C         IF THIS IS SECOND DECIMAL BLOW OFF TO ERROR CODE      GETI0036
      JC=-1                                                     GETI0037
      GO TO 40                                                  GETI0038
C         CHARACTER IS BLANK TREAT AS COMMA IF NOT LEADING      GETI0039
   60 IF(I.EQ.55B)GO TO 80                                      GETI0040
      IF(I.EQ.56B)GO TO 70                                      GETI0041
      GO TO 120                                                 GETI0042
   70 IF(NC.GT.0)GO TO 90                                       GETI0043
      NW=NW+1                                                   GETI0044
      IF(NW.GT.NIN) RETURN                                      GETI0045
      GO TO 40                                                  GETI0046
C         TWO COMMAS ..IGNORE THIS DATA FIELD AND GO ON TO NEXT GETI0047
   80 IF(NC.EQ.0) GO TO 40                                      GETI0048
C         SHIFT DECIMAL TO NUMBER                               GETI0049
   90 X=JS*X*10.**JD                                            GETI0050
      NW=NW+1                                                   GETI0051
```

```
      Y(NW)=X                                              GETI0052
      IF(NW.GE.NIN) RETURN                                 GETI0053
      GO TO 30                                             GETI0054
  110 JD=JD+JC                                             GETI0055
      NC=NC+1                                              GETI0056
C        ADD DIGIT TO NUMBER ,,CAREFULLY                   GETI0057
      X=X*10+(I-33B)                                       GETI0058
      GO TO 40                                             GETI0059
C        ERROR CODE                                        GETI0060
  120 DO 130 K=1,80                                        GETI0061
  130 IC(K)=55B                                            GETI0062
      IC(J)=47B                                            GETI0063
      PRINT 140 ,IC                                        GETI0064
  140 FORMAT(2X,80R1)                                      GETI0065
      PRINT 150                                            GETI0066
  150 FORMAT(* EAD FIELD, RE-ENTER DATA*)                  GETI0067
      GO TO 10                                             GETI0068
      END                                                  GETI0069
      SUBROUTINE AXIS(IX,IY,IEX,IEY,ID,IC,AB,DT,EX,IJ,JZZ,NTB,LINE,SIZ)
C
C IX -ORIGIN X-COORDINATE  (SCREEN   UNITS)
C IY  - ORIGIN Y-COORDINATE (SCREEN   UNITS)
C IE - AXIS LENGTH (SCREEN UNITS)
C ID - NO. OF  DIVISIONS  ON AXIS
C  IC -- 0=HORIZONTAL LINE    ;   1=VERTICAL LINE
C AB--AXIS BEGINNING(REAL UNITS)
C DT--CHANGE IN SCALE BETWEEN TIC MARKS (REAL UNITS)
C NTB--NO. OF MINOR TICKS
C LINE-GRID LINE CODE(DRAW EVERY N GRIDS)
C SIZ-CHARACTER SIZE
      DIMENSION NODEC(4)
      DIMENSION JA(10)
      JZ=JZZ
      XB=IX
      YB=IY
      CALL SWCHAR(1)
      ICH=KIN(SIZ*.873)
      IE=IEX
      IF(IC.EQ.1) IE=IEY
      ICV=ICH*1.6
      CALL PLCHAR(ICH,ICV)
      CALL CSIZE(JH,JV)
      DATA XY/292./
      DO 1 I=1,4
    1 NODEC(I)=0
      Y=0.
C DETERMINING NO. OF DECIMAL PTS IN LABELS ON AXIS
      CALL ANNOT(IX,Y,Z,JA,IJ,NODEC(1),NO,NODE)
      LL=NO
      CALL ANNOT(IY,Y,Z,JA,IJ,NODEC(2),NO,NODE)
      IF(NO.GT.LL)LL=NO
      CALL ANNOT(AB,Y,Z,JA,IJ,NODEC(3),NO,NODE)
      IF(NO.GT.LL)LL=NO
      CALL ANNOT(DT,Y,Z,JA,IJ,NODEC(4),NO,NODE)
      IF(NO.GT.LL)LL=NO
      NODE=MAXO(NODEC(1),NODEC(2),NODEC(3),NODEC(4))
      EX=0.
C DETERMINING EXPONENT
      DA=ABS(DT)
      IF(DA) 3,7,3
    3 IF(DA-99.) 6,4,4
    4 DA=DA/10.
```

```
      EX=EX+1.
      GO TO 3
    5 DA=DA*10.
      EX=EX-1.
    6 IF(DA-.01)  5,7,7
    7 CONTINUE
      XV=AB*10.**(-EX)
      DA=DT*10.**(-EX)
      AA=IC*2-1
      CH=1-IC
      SH=IC
      NT=ID+1
      JT=JV
      IF(IC.EQ.0) JT=(LL+2)*JH
      NA=IE/ID
C**** JZ= HOW MANY TO SKIP LABELING
   60 IF(JT.LT.JZ*NA) GO TO 70
      JZ=2*JZ
      GO TO 60
   70 NX=XB+CH*IE
      NY=YB+SH*IE
      CALL MOVABS(NX,NY)
      IDX=-XY*AA*SH*.07
      IDY=XY*AA*CH*.07
C**** NUMBER OF MINOR TICKS
      NTBB=NTB+1
C**** TOTAL NUMBER OF TICKS
      IA=ID*NTBB
      DEL=FLOAT(IE)/FLOAT(IA)
C  LOOP FOR AXIS LINE & TICS
      DELM=FLOAT(IE)/ID
      DO 30 I=1,NT
      NX=XB+DELM*CH*(NT-I)
      NY=YB+DELM*SH*(NT-I)
      KL=2
      DO 30 J=1,NTBB
      CALL DRWABS(NX,NY)
      CALL DRWABS(NX+IDX*KL,NY+IDY*KL)
      CALL DRWABS(NX,NY)
      IF(I.EQ.NT) GO TO 34
      IA=IA-1
      NX=XB+DEL*CH*IA
      NY=YB+DEL*SH*IA
   30 KL=1
   34 X=IX+IDX
      Y=IY+IDY
      IF(IC.EQ.0) GO TO 61
      X=X-LL*JH
      GO TO 62
   61 X=X-JH
      Y=Y-JV
   62 XV=AB*10.**(-EX)
      YN=1.
      XN=NX
      CALL ANNOT(XV,X,YN,JA,IJ,J,NO,NCDE)
      NN=IFIX(X)-JH
      JJ=IFIX(Y)
      IF(IC.EQ.0) JJ=JJ-IFIX(.1*JV-IDY)
      NNX=NN-JH*(NO/2)-JH/2
      IF(IC.EQ.1) NNX=IX+IDX-6.0*JH
      IF(IC.EQ.1)JJ=JJ-3*JV/8
      CALL NOTATE(NNX,JJ,5,JA)
```

```
      IN=0
      NTT=NT-1
      DEL=FLOAT(IE)/ID
C LABEL AXIS
      DO 63 I=1,NTT
      IN=IN+1
      XV=XV+DA
      XN=XN+CH
      YN=YN+SH
      IF(IN.NE.JZ) GO TO 63
      IN=0
      YN=1.
      CALL ANNOT(XV,XN,YN,JA,IJ,J,NO,NODE)
      IF(IC.EQ.0)GO TO 50
      JJ=JJ+(DEL*JZ)
      GO TO 51
   50 NN=NN+(DEL*JZ)
      NNX=NN-JH*(NC/2)-JH/2
   51 CALL ROTATE(NNX,JJ,5,JA)
   63 CONTINUE
      RETURN
      END
      SUBROUTINE ANNOT(X,Y,Z,JA,IJ,N,NO,NCDE)
C SUBROUTINE TO DETERMINE CHARACTERS FOR LABELLING AXIS
C OUTPUT GOES IN JA(1-10)    (LEFT JUSTIFIED)
      DIMENSION JA(10)
      XX=X
      I=0
      DO 1 J=1,10
    1 JA(J)=32
      ENCODE(10,5,I) XX
    5 FORMAT(F10.2)
      CALL KAN2AS(10,I,JA)
      IF(JA(1).NE.32) GO TO 50
      DO 10 I=1,9
      IF(JA(I).NE.32) GO TO 40
   10 CONTINUE
      GO TO 50
   40 DO 45 J=I,10
   45 JA(J-I+1)=JA(J)
      L=12-I
      DO 46 K=L,10
   46 JA(K)=32
   50 CONTINUE
      IF(Z.GT..5) GO TO 30
      N=0
      DO 110 I=1,10
      IF(JA(I).NE.46) GO TO 110
      IF(JA(I+2).NE.32.AND.JA(I+2).NE.48) GO TO 20
      IF(JA(I+1).NE.32.AND.JA(I+1).NE.48) GO TO 15
  110 CONTINUE
      GO TO 25
   15 N=1
      GO TO 25
   20 N=2
   25 CONTINUE
      RETURN
   30 CONTINUE
      IF(NCDE.GT.0) GOTO2
      DO 101 I=1,10
      IF(JA(I).NE.46) GOTO101
      J=I-1
      DO 201 K=I,10
```

```
  201 JA(K)=32
      GO TO 100
  101 CONTINUE
      GOTO100
    2 DO 12 I=1,10
      IF(JA(I).NE.46) GOTO 12
      J=I+NCDE+1
      DO 22 K=J,10
   22 JA(K)=32
      J=J-1
      GO TO 100
   12 CONTINUE
  100 CONTINUE
      NO=5-J
      IF(JA(1).EQ.46.AND.J.NE.1) JA(1)=32
      IF(J.GT.4)RETURN
      DO 461 L=1,J
      JA(6-L)=JA(J+1-L)
  461 JA(J-L+1)=32
      RETURN
      END
CAXSCAL
      SUBROUTINE AXSCALE(X,AXL,N,XSTART,XINC,ISIZE)
C ***  X-ARRY OF DATA    AXL-AXIS LENGTH INCHES
C ***  N- NO. OF POINTS IN ARRAY $ XINC-INCREMENT PER INCH
C ***  XSTART FIRST NO. ON AXIS
C ***  ISIZE=0 USE 10 TO THE INCH SCALING  ,NOT =0 USE 20
      DIMENSION X(1),L(5)
      XMAX=XMIN=X(1) $ L(1)=1 $L(2)=2 $ L(3)=5  $L(4)=10 $ L(5)=20
      IF(AXL.LE.0.)AXL=1.
      IF(ISIZE.NE.0) L(3)=4
      IF(N.LE.1) GO TO 70
      DO 60 I=2,N
      XCHECK=X(I)
      IF(XCHECK.GT.XMAX)XMAX=XCHECK
      IF(XCHECK.LT.XMIN)XMIN=XCHECK
   60 CONTINUE
   70 F=(XMAX-XMIN)/AXL
      IF(F.EQ.0.) F=XMAX/AXL
      J=-10
      DO 100 I=1,20
      K=10.**J*F
      IF(K.NE.0) GO TO 110
  100 J=J+1
  110 DO 120 I=2,4
      IF(L(I).GT.K)  GO TO 130
  120 CONTINUE
  130 XINC=L(I-1)/10.**J
      K=XMIN/XINC
      IF((XMIN/XINC).LT.-.06) K=K-1
      XSTART=K*XINC
      XH=(XMAX-XSTART)/XINC
      XL=(XMIN-XSTART)/XINC
      IF(XH.GT.(AXL+.06).OR.XL.LT.-.06) 140,150
  140 I=I+1
      GO TO 130
  150 CONTINUE
      RETURN
      END
```

What is claimed is:

1. A process for generating a camera-ready hardcopy of a graphical plot of certain physical quantities or existing plots using a general purpose digital computer, a graphics display terminal having an alpha-numeric keyboard and a cursor control, and an associated printer, comprising in sequence the steps of:

storing in the computer an interactive graphics code and coordinate data in tabular form associated with the physical quantities or existing plots, said code being identified by interactive command repetition and feedback for deletion, addition and transition of lines, points and labels while processing the stored coordinate data;

plotting on the screen the stored coordinate data in a format according to said code;

generating on the screen lines between the plotted coordinate data according to said code;

revising the coordinate data and the lines plotted on the screen by manipulating the cursor and keyboard in accordance with said code, said revising step further including
adding coordinate data to create new lines,
deleting coordinate data to remove lines, and
moving coordinate data to change the position of existing lines; and printing a hardcopy of the revised plot on the printer.

2. A process as recited in claim 1, wherein, immediately following said step of revising the coordinate data, the following step is included:
labeling appropriate areas of the revised plot on the screen by manipulating the cursor and keying the computer in accordance with the interactive code.

3. A process as recited in claim 2, wherein immediately following said step of labeling, the following step is included:
shading appropriate areas of the revised plot on the screen by manipulating the cursor and keying the computer in accordance with the interactive code.

4. A process as recited in claim 3, wherein immediately following said step of shading, the following step is included:

applying appropriate reference symbols and characters to the revised plot on the screen by manipulating the cursor and keying the computer in accordance with the interactive code.

5. A process as recited in claim 1, wherein said step of plotting comprises:
establishing appropriately scaled and titled coordinate axes on the screen; and
establishing appropriate grid lines substantially horizontally and vertically on the screen.

* * * * *